US008397259B2

(12) United States Patent
Knudson et al.

(10) Patent No.: US 8,397,259 B2
(45) Date of Patent: Mar. 12, 2013

(54) PROGRAM GUIDE SYSTEM WITH ADVERTISEMENTS

(75) Inventors: Edward B. Knudson, Littleton, CO (US); Joel G. Hassell, Arvada, CO (US); Connie T. Marshall, Muskogee, OK (US); Thomas R. Lemmons, Sand Springs, OK (US); Steven J. Reynolds, Littleton, CO (US); Robert A. Knee, Lansdale, PA (US); Kenneth F. Carpenter, Jr., Mount Laurel, NJ (US); William L. Thomas, Bixby, OK (US); W. Benjamin Herrington, Tulsa, OK (US); Steven C. Williamson, Broken Arrow, OK (US); Michael D. Ellis, Boulder, CO (US); Donald W. Allison, Tulsa, OK (US)

(73) Assignee: United Video Properties, Inc., Santa Clara, CA (US)

( * ) Notice: Subject to any disclaimer, the term of this patent is extended or adjusted under 35 U.S.C. 154(b) by 286 days.

(21) Appl. No.: 12/891,385

(22) Filed: Sep. 27, 2010

(65) Prior Publication Data

US 2011/0167446 A1 Jul. 7, 2011

Related U.S. Application Data

(60) Continuation of application No. 11/901,004, filed on Sep. 14, 2007, now abandoned, which is a division of application No. 10/947,545, filed on Sep. 20, 2004, now Pat. No. 7,287,267, which is a continuation of application No. 09/070,604, filed on Apr. 30, 1998, now abandoned.

(51) Int. Cl.
*G06F 3/00* (2006.01)
*G06F 13/00* (2006.01)
*H04N 5/445* (2006.01)

(52) U.S. Cl. .......................................... 725/42; 725/52
(58) Field of Classification Search .................... 725/39, 725/42, 43, 52
See application file for complete search history.

(56) References Cited

U.S. PATENT DOCUMENTS

| 4,694,490 | A | 9/1987 | Harvey et al. |
| 5,335,277 | A | 8/1994 | Harvey et al. |
| 5,485,197 | A | 1/1996 | Hoarty |
| 5,559,548 | A | 9/1996 | Davis et al. |

(Continued)

FOREIGN PATENT DOCUMENTS

| JP | 2000535142 | 2/2002 |
| JP | 2000546525 | 5/2002 |

(Continued)

*Primary Examiner* — Ngoc Vu
(74) *Attorney, Agent, or Firm* — Ropes & Gray LLP

(57) ABSTRACT

An interactive television program guide is provided in which advertisements may be displayed on program guide screens. Banner advertisements may be displayed above and below program listings. Panel advertisements may be provided adjacent to program listings. The advertisements may contain video. The advertisements may be used to promote television programs and conventional goods and services. When a user selects an advertisement, the program guide provides the user with an opportunity to order products or services, request information, set reminders for upcoming programs, view program descriptions, record programs, or take other such actions. Embedded advertisements may be provided within the program listings region and may be automatically displayed immediately adjacent to related program listings.

24 Claims, 24 Drawing Sheets

U.S. PATENT DOCUMENTS

| | | |
|---|---|---|
| 5,559,549 A | 9/1996 | Hendricks et al. |
| 5,585,866 A | 12/1996 | Miller et al. |
| 5,589,892 A | 12/1996 | Knee et al. |
| 5,600,364 A | 2/1997 | Hendricks et al. |
| 5,600,573 A | 2/1997 | Hendricks et al. |
| 5,635,978 A | 6/1997 | Alten et al. |
| 5,659,350 A | 8/1997 | Hendricks et al. |
| 5,682,195 A | 10/1997 | Hendricks et al. |
| 5,699,107 A | 12/1997 | Lawler et al. |
| 5,734,853 A | 3/1998 | Hendricks et al. |
| 5,740,549 A | 4/1998 | Reilly et al. |
| 5,805,154 A | 9/1998 | Brown |
| 5,830,068 A | 11/1998 | Brenner et al. |
| 5,838,314 A | 11/1998 | Neel et al. |
| 5,940,073 A | 8/1999 | Klosterman et al. |
| 5,974,222 A | 10/1999 | Yuen et al. |
| 6,151,059 A | 11/2000 | Schein et al. |
| 6,177,931 B1 | 1/2001 | Alexander et al. |
| 6,263,501 B1 | 7/2001 | Schein et al. |
| 6,323,911 B1 | 11/2001 | Schein et al. |
| 6,388,714 B1 | 5/2002 | Schein et al. |
| 6,564,378 B1 | 5/2003 | Satterfield et al. |

FOREIGN PATENT DOCUMENTS

| | | |
|---|---|---|
| JP | 200398580 A | 9/2003 |
| JP | 4062577 B2 | 1/2008 |
| TW | 306099 | 5/1997 |
| WO | WO-9507003 A1 | 3/1995 |
| WO | WO-9532585 A1 | 11/1995 |
| WO | WO-9609721 A1 | 3/1996 |
| WO | WO-9634491 A1 | 10/1996 |
| WO | WO-9641478 A1 | 12/1996 |
| WO | WO-9707656 A2 | 3/1997 |
| WO | WO-9718675 A1 | 5/1997 |
| WO | WO-97/31480 A1 | 8/1997 |
| WO | WO-9742763 A1 | 11/1997 |
| WO | WO-9748230 A1 | 12/1997 |
| WO | WO-9749237 A1 | 12/1997 |
| WO | WO-9749242 A1 | 12/1997 |
| WO | WO-9806219 A1 | 2/1998 |
| WO | WO-9827723 | 6/1998 |

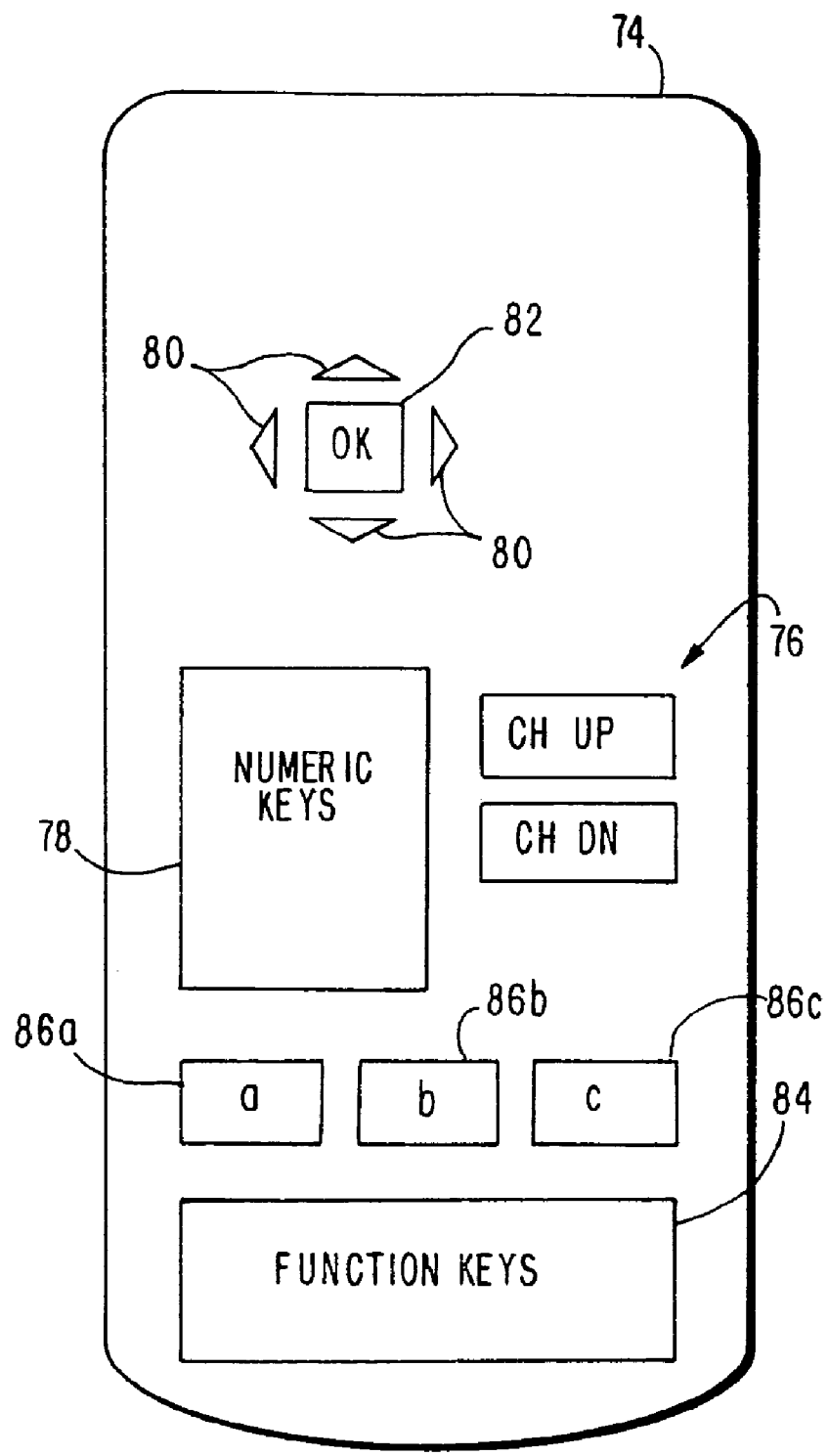

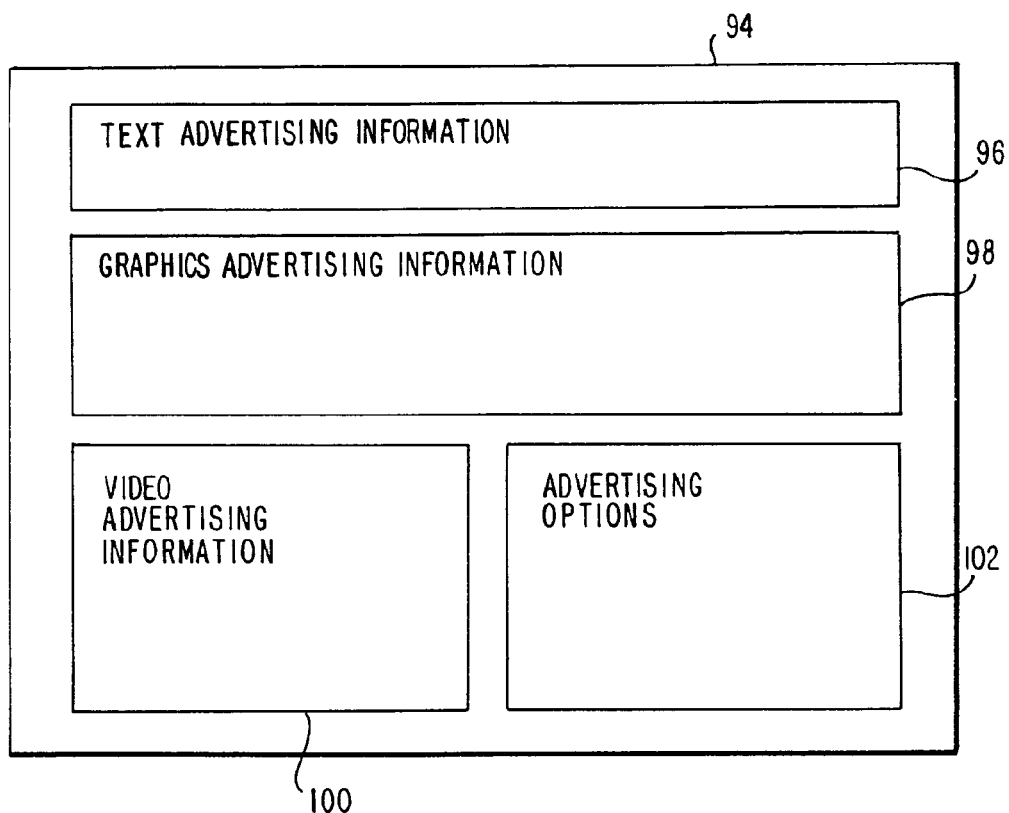

FIG. 7

| MSO LOGO | LISTINGS BY TIME | | GUIDE PROVIDER LOGO | |
|---|---|---|---|---|
| (a) | (c) TODAY | 2:00p | 2:30p | |
| | CH 1 | PROGRAM 1 | PROGRAM 2 | 120 |
| ADVERTISEMENT | CH 2 | PROGRAM 1 | PROGRAM 2 | |
| | CH 3 | PROGRAM 1 | PROGRAM 2 | |
| | ADVERTISEMENT | | | 118 |
| (b) | CH 4 | PROGRAM 1 | | |
| | CH 5 | PROGRAM 1 | | |
| ADVERTISEMENT | CH 6 | PROGRAM 1 | PROGRAM 2 | |
| | CH 7 | PROGRAM 1 | | |
| | CH 8 | PROGRAM 1 | PROGRAM 2 | |
| | CH 9 | PROGRAM 1 | | 122 |

| LOGOS | | | |
|---|---|---|---|
| (a) ADVERTISEMENT | (c)TODAY | 2:00 p | 2:30 p |
| | CH 2 | PROGRAM 1 | PROGRAM 2 |
| | CH 3 | PROGRAM 1 | PROGRAM 2 |
| | ADVERTISEMENT | | |
| | CH 4 | PROGRAM 1 | |
| (b) ADVERTISEMENT | CH 5 | PROGRAM 1 | |
| | CH 6 | PROGRAM 1 | PROGRAM 2 |
| | CH 7 | PROGRAM 1 | |
| | CH 8 | PROGRAM 1 | PROGRAM 2 |
| | CH 9 | PROGRAM 1 | |
| | CH 10 | PROGRAM 1 | PROGRAM 2 |

FIG. 8

| | | | |
|---|---|---|---|
| MSO LOGO | LISTINGS BY TIME | GUIDE PROVIDER LOGO | |
| (a) ADVERTISEMENT | (c) TODAY | 2:00 p | 2:30 p |
| | CH 2 | PROGRAM 1 | PROGRAM 2 |
| | CH 3 | PROGRAM 1 | PROGRAM 2 |
| | CH 4 | PROGRAM 1 | |
| | ADVERTISEMENT | | |
| (b) ADVERTISEMENT | CH 5 | PROGRAM 1 | |
| | CH 6 | PROGRAM 1 | PROGRAM 2 |
| | CH 7 | PROGRAM 1 | |
| | CH 8 | PROGRAM 1 | PROGRAM 2 |
| | CH 9 | PROGRAM 1 | |
| | CH 10 | PROGRAM 1 | PROGRAM 2 |

| CH 1 | PROGRAM 1 | PROGRAM 2 |
|---|---|---|
| CH 2 | PROGRAM 1 | |
| CH 3 | PROGRAM 1 | |
| ADVERTISEMENT | | |
| CH 4 | PROGRAM 1 | PROGRAM 2 |
| CH 5 | PROGRAM 1 | |
| CH 6 | PROGRAM 1 | |

| CH 7 | PROGRAM 1 | |
|---|---|---|
| CH 8 | PROGRAM 1 | PROGRAM 2 |
| CH 9 | PROGRAM 1 | PROGRAM 2 |
| ADVERTISEMENT | | |
| CH 10 | PROGRAM 1 | |
| CH 11 | PROGRAM 1 | |
| CH 12 | PROGRAM 1 | PROGRAM 2 |

FIG. 13

| | TODAY | 5:00p | 5:30p |
|---|---|---|---|
| ADVERTISEMENT 146 | PROGRAM LISTING — 150 | | |
| | ADVERTISEMENT — 142 | | |
| | PROGRAM LISTING | | |
| | PROGRAM LISTING — 140 | | |
| ADVERTISEMENT 148 | PROGRAM LISTING | | |
| | ADVERTISEMENT — 144 | | |
| | PROGRAM LISTING — 152 | | |
| | PROGRAM LISTING | | |
| 2:03 | | | |

FIG.21

| | TODAY | 2:00p | 2:30p | |
|---|---|---|---|---|
| ADVERTISEMENT | CH 1 | PROGRAM 1 | PROGRAM 2 | 252 |
| | "PROGRAM X" TONIGHT ON CH 1 || | 248 |
| | CH 3 | PROGRAM 1 | PROGRAM 2 | |
| | CH 4 | PROGRAM 1 | | 250 |
| | CH 5 | PROGRAM 1 | | |
| ADVERTISEMENT | CH 6 | PROGRAM 1 | PROGRAM 2 | |
| | CH 7 | PROGRAM 1 | | |
| | CH 8 | PROGRAM 1 | | |
| | CH 9 | PROGRAM 1 | | |

(LOGO at top spanning full width)

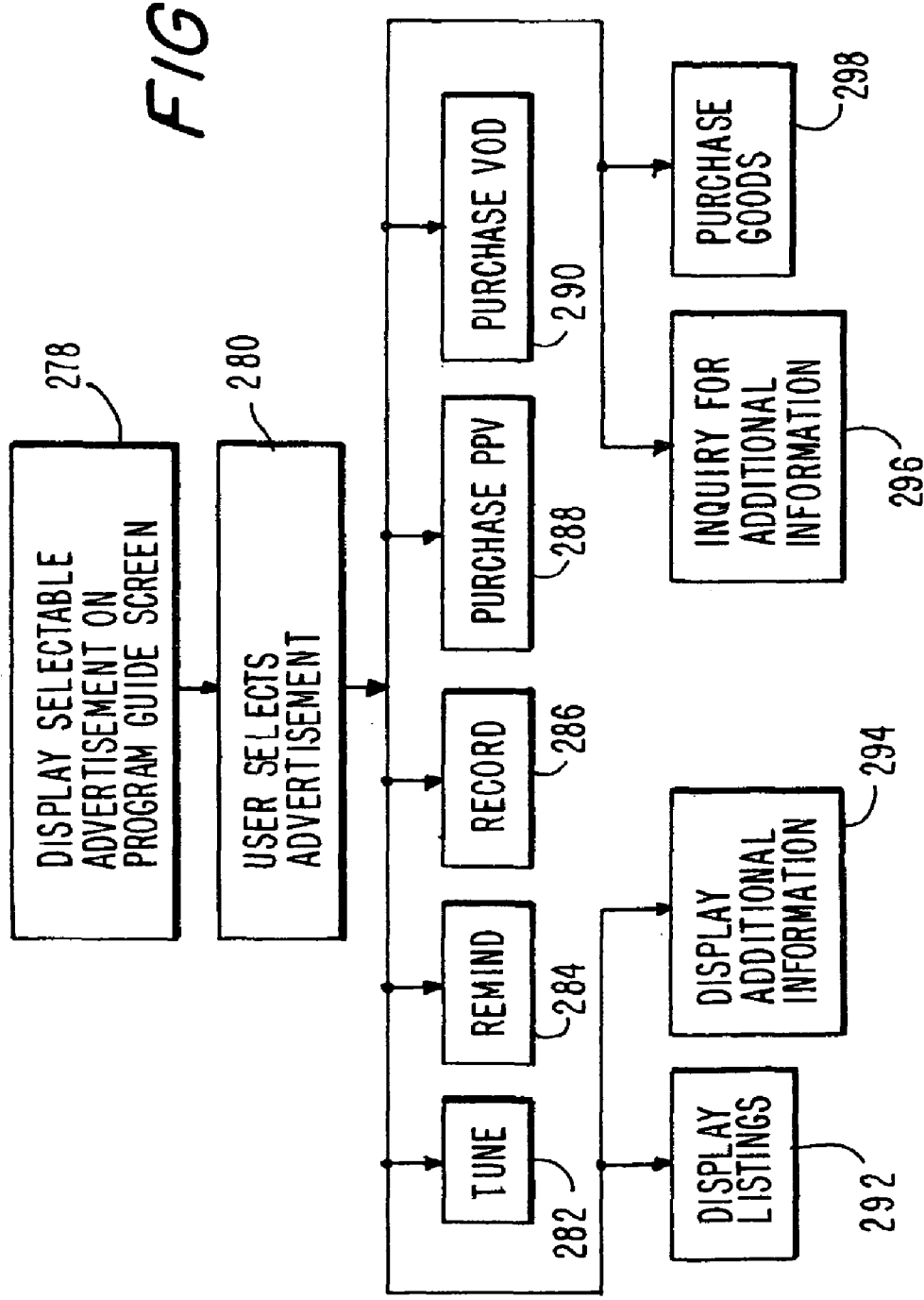

PROGRAM GUIDE SYSTEM WITH ADVERTISEMENTS

CROSS-REFERENCE TO RELATED APPLICATIONS

This application is a continuation of a pending U.S. patent application Ser. No. 11/901,004 filed Sep. 14, 2007, which is a divisional of U.S. application Ser. No. 10/947,545, now U.S. Pat. No. 7,287,267 filed Sep. 20, 2004, which is a continuation of U.S. patent application Ser. No. 09/070,604, filed Apr. 30, 1998, now abandoned, the disclosures of which are incorporated by reference herein in their entireties.

BACKGROUND OF THE INVENTION

This invention relates to interactive television program guides, and more particularly, to techniques for presenting advertising to users of such television program guides.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guides are typically implemented on set-top boxes. Such program guides allow users to view television program listings in different display formats. For example, a user may instruct the program guide to display a grid of program listings organized in a channel-ordered or a time-ordered list. Users may also search and sort program listings by theme (e.g., movies, sports, etc.) or by title (i.e, alphabetically). A user may obtain additional information for a program by placing a highlight region on a desired program listing and pressing an "info" key. The user may purchase a pay program from the program guide or may set a reminder for a future program by placing the highlight region on a program listing and pressing an "OK" key. Some systems allow the user to select a program for recording by placing the highlight region on a program listing and pressing a "record" key.

Although interactive program guides facilitate the user's task of locating programming of interest, it would be desirable if more information and more options were available to the user. For example, it would be desirable if advertisements were available in the program guide to give the user access to more information and services.

It is therefore an object of the present invention to provide an interactive television program guide system that provides advertising on various program guide screens.

It is also an object of the invention to provide an interactive television program guide system with interactive advertising.

It is also an object of the invention to provide ways in which a user may navigate to various program guide advertisements.

SUMMARY OF THE INVENTION

These and other objects of the invention are accomplished in accordance with the principles of the present invention by providing a system having an interactive television program guide that provides advertising on various program guide screens. Banner advertisements may be displayed above and below a program listings region. The user may scroll the program listings in the program listings region by using a cursor key to move a highlight to the upper or lower banner advertisement and by then activating the cursor key another time.

Advertisements may contain text, graphics (including animation), and video. Advertisements may also contain a list of program options.

Embedded advertisements may be provided in the program listings region. The program guide may display such embedded advertisements immediately adjacent to a related program listing. For example, a program advertisement for "Seinfeld" may be placed immediately adjacent to a program listing for the channel NBC, which is the channel on which the program "Seinfeld" is scheduled to appear.

Panel advertisements may be provided adjacent to the program listings. A highlight may be navigated between the program listings in the program listings region and the panel advertisements using dedicated remote control navigation keys (e.g., keys labeled "A," "B," and "C"), each of which is associated with a particular region of the screen (e.g., one of the panel advertisements or the program listing region.) This type of arrangement may also be used to navigate to banner advertisements.

Another way in which to navigate to the panel advertisements is to use remote control cursor keys. If embedded advertisements are provided in the program listings region, they may be used as navigational bridges between the program listings region and the panel advertisements. The highlight may also be navigated from the program listings region to the panel advertisements without using such navigational bridges if desired.

Further features of the invention, its nature and various advantages will be more apparent from the accompanying drawings and the following detailed description of the preferred embodiments.

BRIEF DESCRIPTION OF THE DRAWINGS

FIG. 4a is a simplified plan view of an illustrative remote control in accordance with the present invention.

FIG. 5 is a diagram of an illustrative program guide screen containing advertising information (text, graphics, and video) and advertising options in accordance with the present invention.

FIG. 7 is a diagram of an illustrative program guide screen containing panel advertisements and a program listings region having an embedded advertisement in accordance with the present invention.

FIG. 8 is a diagram of an illustrative program guide screen containing panel advertisements and a program listings region having an embedded advertisement that may be scrolled with the program listings in accordance with the present invention.

FIG. 9 is a diagram of an illustrative program guide screen containing panel advertisements and a program listings region having an embedded advertisement with a fixed location within the program listings in accordance with the present invention.

FIG. 13 is a diagram of an illustrative program guide screen containing panel advertisements and a program listings region having two embedded advertisements that may be used as navigational bridges in accordance with the present invention.

FIG. 21 is a diagram of an illustrative program guide screen containing a program listings region with an embedded advertisement that has been automatically positioned immediately adjacent to an associated program listing in accordance with the present invention.

FIG. 23 is a flow chart of steps involved in presenting selectable advertisements and in taking suitable actions when such advertisements are selected using a program guide in accordance with the present invention.

DETAILED DESCRIPTION OF THE PREFERRED EMBODIMENTS

Figure 1:
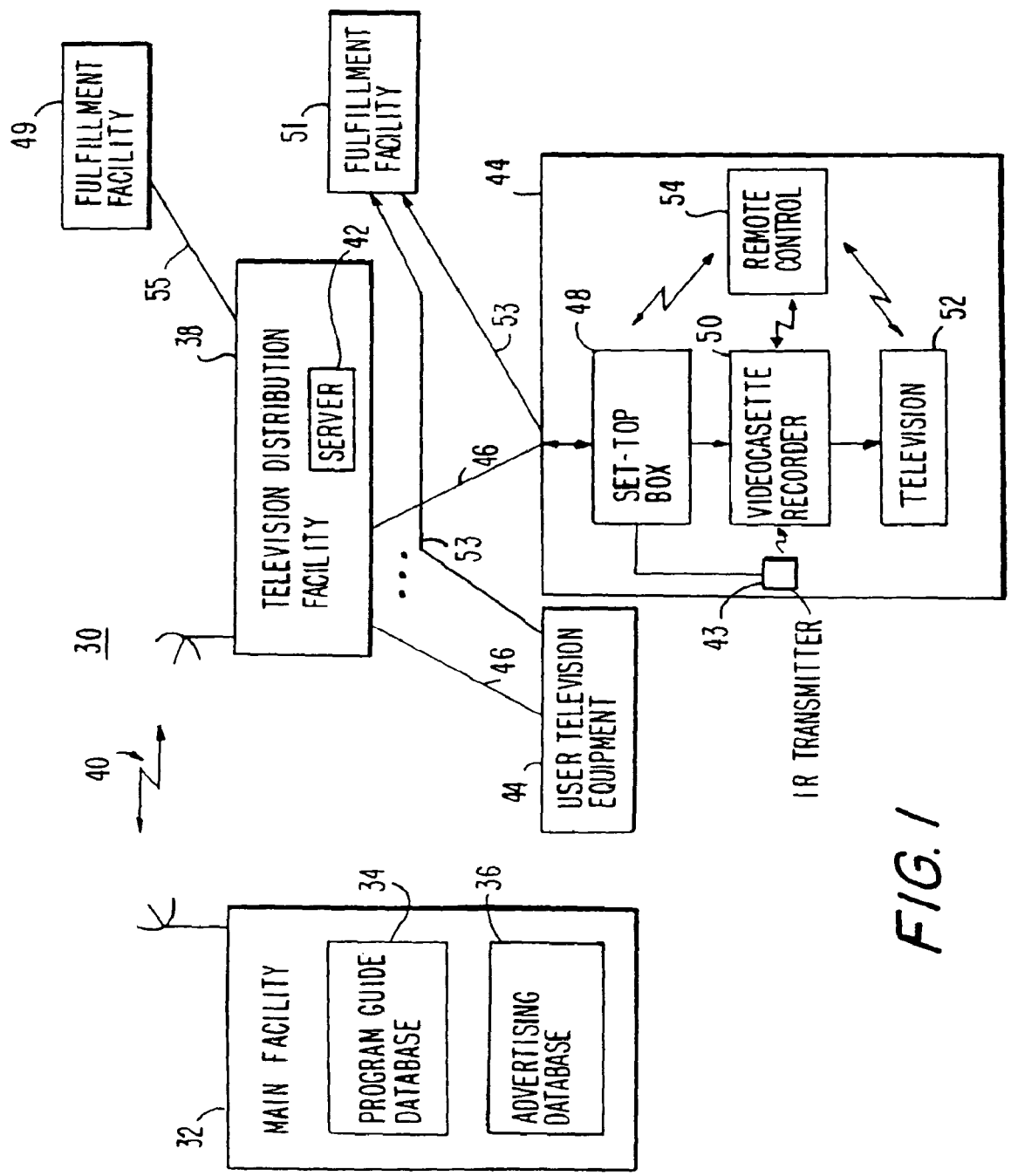
FIG. 1 is a diagram of a system in which an interactive television program guide is implemented in accordance with the present invention.

An illustrative program guide system 30 in accordance with the present invention is shown in FIG. 1. Main facility 32 contains a program guide database 34 for storing program guide information such as television program guide listings data, pay-per-view ordering information, television program promotional information, etc. Main facility 32 also contains an advertising database 36 for storing advertising information. Information from databases 34 and 36 may be transmitted to television distribution facility 38 via communications link 40. Link 40 may be a satellite link, a telephone network link, a cable or fiber optic link, a microwave link, a combination of such links, or any other suitable communications path. If it is desired to transmit video signals (e.g., for advertising and promotional videos) over link 40 in addition to data signals, a relatively high bandwidth link such as a satellite link is generally preferable to a relatively low bandwidth link such as a telephone line.

Television distribution facility 38 is a facility for distributing television signals to users, such as a cable system headed, a broadcast distribution facility, or a satellite television distribution facility.

The program guide information transmitted by main facility 32 to television distribution facility 38 includes television program listings data such as program times, channels, titles, descriptions, etc. Transmitted program information also includes pay program data such as pricing information for individual programs and subscription channels, time windows for ordering programs and channels, telephone numbers for placing orders that cannot be impulse ordered, etc. The advertising information transmitted by main facility 32 to television distribution facility 38 includes text, graphics, and video advertisements for various products and services. If desired, some of the program guide and advertising information may be provided using data sources at facilities other than main facility 32. For example, data related to pay program order processing (e.g., billing data and the like) may be generated by an order processing and billing system that is separate from main facility 32 and separate from television distribution facility 38. Similarly, advertising information may be generated by an advertising facility that is separate from main facility 32 and television distribution facility 38.

Regardless of its source, advertising information may be maintained on a server 42 within television distribution facility 38 if desired. Server 42 may be capable of handling text, graphics, and video.

Television distribution facility 38 distributes program guide and advertising information to the user television equipment 44 of multiple users via communications paths 46. User television equipment 44 may be any suitable equipment for providing television to the user that contains sufficient processing capabilities to implement an interactive television program guide. Paths 46 may be cable links, fiber optic links, satellite links, broadcast links, or other suitable link or combination of such links. Any suitable communications scheme may be used to transmit data over paths 46, including in-band transmissions, out-of-band transmissions, digital transmissions, analog transmissions, cable transmissions, satellite transmissions, over-the-air transmissions, multichannel multipoint distribution services (MMDS) transmissions, etc.

If desired, program guide data may be distributed over an out-of-band channel on paths 46 or over an in-band path such as the vertical blanking interval (VBI). Advertising information may be distributed using any of a number of suitable techniques. For example, text and graphics advertisements may be distributed over an out-of-band channel using an out-of-band modulator. Video advertisements may also be distributed in this way, although large quantities of video information may be more efficiently distributed using one or more digital channels on path 46. Such digital channels may also be used for distributing text and graphics.

Each user has a receiver, which is typically a set-top box such as set-top box 48, but which may be other suitable television equipment such as an advanced television receiver into which circuitry similar to set-top-box circuitry has been integrated or a personal computer television (PC/TV). Program guide data is distributed to set-top boxes 48 periodically. Television distribution facility 38 may also poll set-top boxes 48 periodically for certain information (e.g., pay program account information or information regarding programs that have been purchased and viewed using locally-generated authorization techniques). Main facility 32 preferably contains a processor to handle information distribution tasks. Each set-top box 48 preferably contains a processor to handle tasks associated with implementing a program guide application on the set-top box 48. Television distribution facility 38 may contain a processor for handling tasks associated with the distribution of program guide and advertising information.

Each set-top box 48 is typically connected to an optional videocassette recorder 50 so that selected television programs may be recorded. Each videocassette recorder 50 is connected to a television 52. To record a program, set-top box 48 tunes to a particular channel and sends control signals to videocassette recorder 50 (e.g., using infrared transmitter 43) that direct videocassette recorder 50 to start and stop recording at the appropriate times.

During use of the interactive television program guide implemented on set-top box 48, television program listings may be displayed on television 52. Each set-top box 48, videocassette recorder 50, and television 52 may be controlled by one or more remote controls 54 or any other suitable user input interface such as a wireless keyboard, mouse, trackball, dedicated set of keys, etc.

Communications paths 46 preferably have sufficient bandwidth to allow television distribution facility 38 to distribute scheduled television programming, pay programming, advertising and other promotional videos, and other video information to set-top boxes 44 in addition to non-video program guide and advertising data. Multiple television and audio channels (analog, digital, or both analog and digital) may be provided to set-top boxes 48 via communications paths 46. If desired, program listings and advertising information may be distributed by one or more distribution facilities that are similar to but separate from television distribution facility 38 using communications paths that are separate from communications paths 46.

Certain functions such as pay program purchasing may require set-top boxes 48 to transmit data to television distribution facility 38 over communications paths 46. If desired, such data may be transmitted over telephone lines or other separate communications paths. If functions such as these are provided using facilities separate from television distribution facility 38, some of the communications involving set-top boxes 48 may be made directly with the separate facilities.

Users may interactively order additional information, products, or services. Such orders may be satisfied by fulfillment facilities 49 and 51. If desired, orders may be transmitted directly to fulfillment facilities such as fulfillment facility 51 via links 53, which may be telephone links, the Internet, or other suitable communications links. Orders may also be transmitted to television distribution facility 38 via links 46, where the billing system of the television distribution facility may be used. After the television distribution facility 38 has processed the user's order, television distribution facility 38 may transmit the order to fulfillment facility 49 via link 55.

A number of suitable techniques may be used to distribute videos related to advertising. For example, if each path 46 includes a number of traditional analog television channels, one or more of these channels may be used to support a number of digital channels. The bandwidth of each analog channel that is used to support digital channels may support ten or more of such digital channels. If desired, videos may be provided from server 42 in a continuously looped arrangement on these digital channels. Information provided to set-top box 48 may then be used to determine which digital channels to tune to when it is time to display a desired video. Alternatively, videos may be provided on demand. With this approach, set-top box 48 and server 42 may negotiate to determine a channel on which to provide the desired video. Videos that originate from main facility 32 or a separate facility are preferably distributed to user television equipment 44 using these or other suitable techniques.

Figure 2:
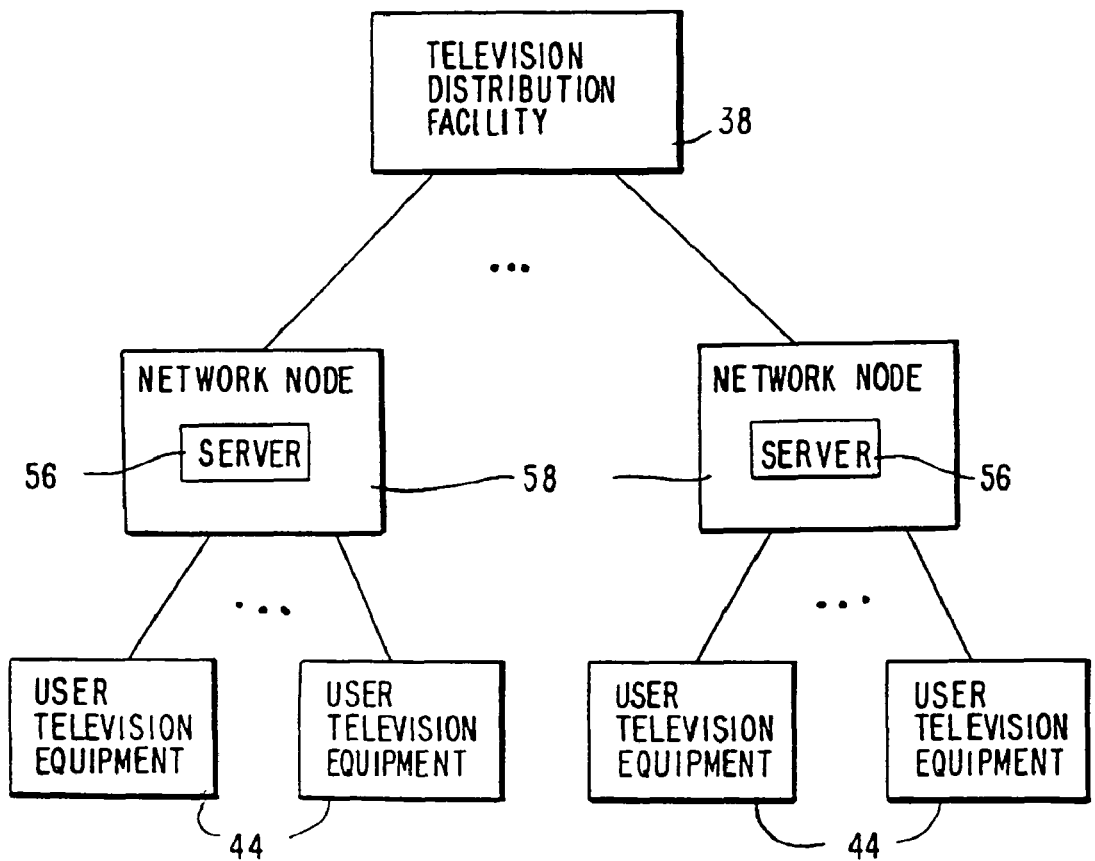
FIG. 2 is a diagram of a system similar to the system of FIG. 1 showing how servers may be located at network nodes in accordance with the present invention.

As shown in FIG. 2, the capabilities of server 42 may be provided using servers 56 located at network nodes 58. Servers such as servers 56 may be used instead of server 42 or may be used in conjunction with a server 42 located at the television distribution facility.

Graphics information for advertisements may be downloaded periodically (e.g., once per day) to set-top boxes 48 of FIG. 1 and stored locally. The graphics information may be accessed locally when needed by the program guide implemented on set-top box 48. Alternatively, graphics information may be provided in a continuously-looped arrangement on one or more digital channels on paths 46. With such a continuously-looped arrangement, a map indicating the location of the latest graphics information is preferably downloaded periodically to set-top boxes 48 (e.g., once per day). This allows the content on the digital channels to be updated. The program guides on set-top boxes 48 may use the map to locate desired graphics information on the digital channels. Another approach involves using a server such as server 42 or servers 56 (FIG. 2) to provide the graphics information after a set-top box 48 and that server have negotiated to set up a download operation. A bitmap or other suitable set of graphics information may then be downloaded from the server to the set-top box. If desired, the server may download instructions informing the set-top box where the desired graphics information can be located on a particular digital channel. The graphics information can be updated periodically if the server that is responsible for downloading the instructions for informing the set-top box of the location of the graphics information is also updated periodically.

Text information for advertisements may be provided to set-top boxes 48 using the same paths that are used for distributing program guide data. For example, advertising data from database 36 of FIG. 1 may be provided to set-top boxes 48 using link 40, television distribution facility 38, and paths 46. The text information may be stored locally in set-top boxes 48 and updated periodically (e.g., once per day).

Text information, graphics information, and videos for advertisements may also be distributed using a combination of these techniques or any other suitable technique.

If desired, advertising related information (whether video, graphics, text, or a combination of video, graphics, and text) may be presented to the user based on the user's interests, as determined by the user's interactions with the program guide. This is described in Knudson et al. U.S. patent application Ser. No. 09/034,939, filed Mar. 4, 1998, which is hereby incorporated by reference herein in its entirety.

Figure 3:
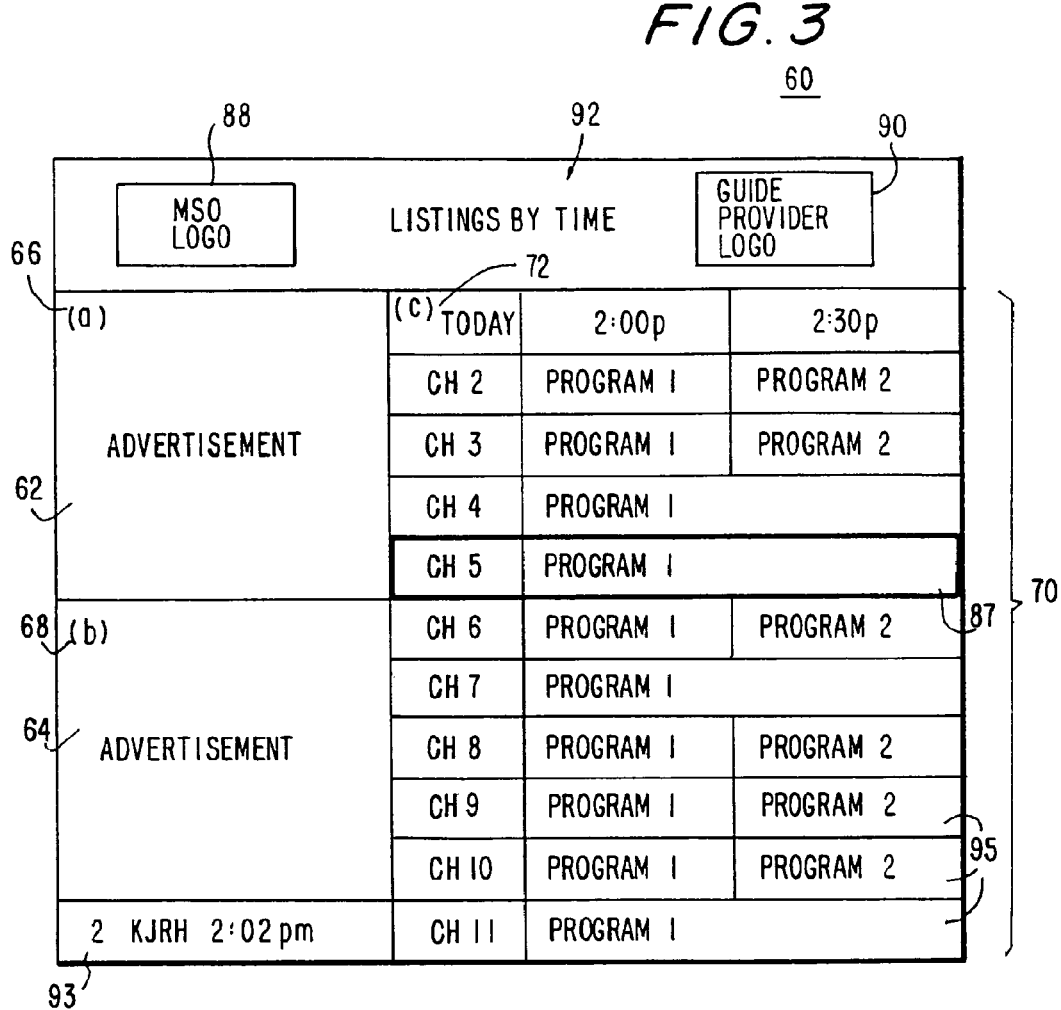
FIG. 3 is a diagram of an illustrative program guide screen containing panel advertisements and a program listings region in accordance with the present invention.

As shown in FIG. 3, the program guide of the present invention may display a program guide screen such as by time listings screen 60 that contains advertising information in the form of panel advertisements 62 and 64. Although the advertisements depicted in FIG. 3 are shown in the context of a by time program guide listings screen, advertisements may be displayed as part of any program guide screen if desired. Examples of program guide screens on which advertisements may be displayed include a menu screen, a by channel listings screen, a screen containing program listings for premium channels, a pay-per-view listings screen, a screen containing programs for a particular genre of programming, a help screen, a music channel menu, a search screen, etc.

The content of advertisements 62 and 64 may be cycled over a suitable time period (e.g., every few seconds) if desired. Transitions between advertisements such as advertisements 62 and 64 or advertisements of any other format that are cycled may be abrupt or may involve a gradual fade, dissolve, wipe, morph, or other suitable special effect. If the user has highlighted a particular advertisement, the program guide may inhibit cycling of that advertisement.

Each advertisement may have a label that corresponds to a key on a remote control that the user may press to access the advertisement. For example, advertisement 62 has label 66 (i.e., the letter "A") and advertisement 64 has label 68 (i.e., the letter "B"). Other areas on the program guide screen may also be provided with such labels if desired. For example, program listings region 70 has label 72 (i.e., the letter "C").

A suitable remote control that may be used to navigate between advertisement 62, advertisement 64, and program listings region 70 is shown in FIG. 4a. When the user presses navigation keys 86a (i.e., the "A"), the program guide highlights advertisement 62 of FIG. 3, which is the region of the program guide screen containing label 66 (the letter "A"). When the user presses navigation key 86b, the program guide highlights advertisement 64 of FIG. 3, which is the region of the program guide screen containing label 68 (the letter "B"). When the user presses navigation key 86c, the program guide places a highlight region such as highlight 87 of FIG. 3 on one of the program listings in program listings region 70, which is the region of program guide screen 60 containing label 72 (the letter "C").

Remote control 74 of FIG. 4a has channel up and down keys 76, numeric keys 78, up, down, right, and left cursor keys 80, a select or "OK" key 82, and functions keys 84. Function keys 84 may include a "menu" key, an "exit" key, a "guide" key, and keys for other program guide functions. Various other keys such as a power on/off key, volume control keys, etc. are typically provided on remote control 74, but are not shown in FIG. 4a to avoid over-complicating the drawing.

Figure 4B:
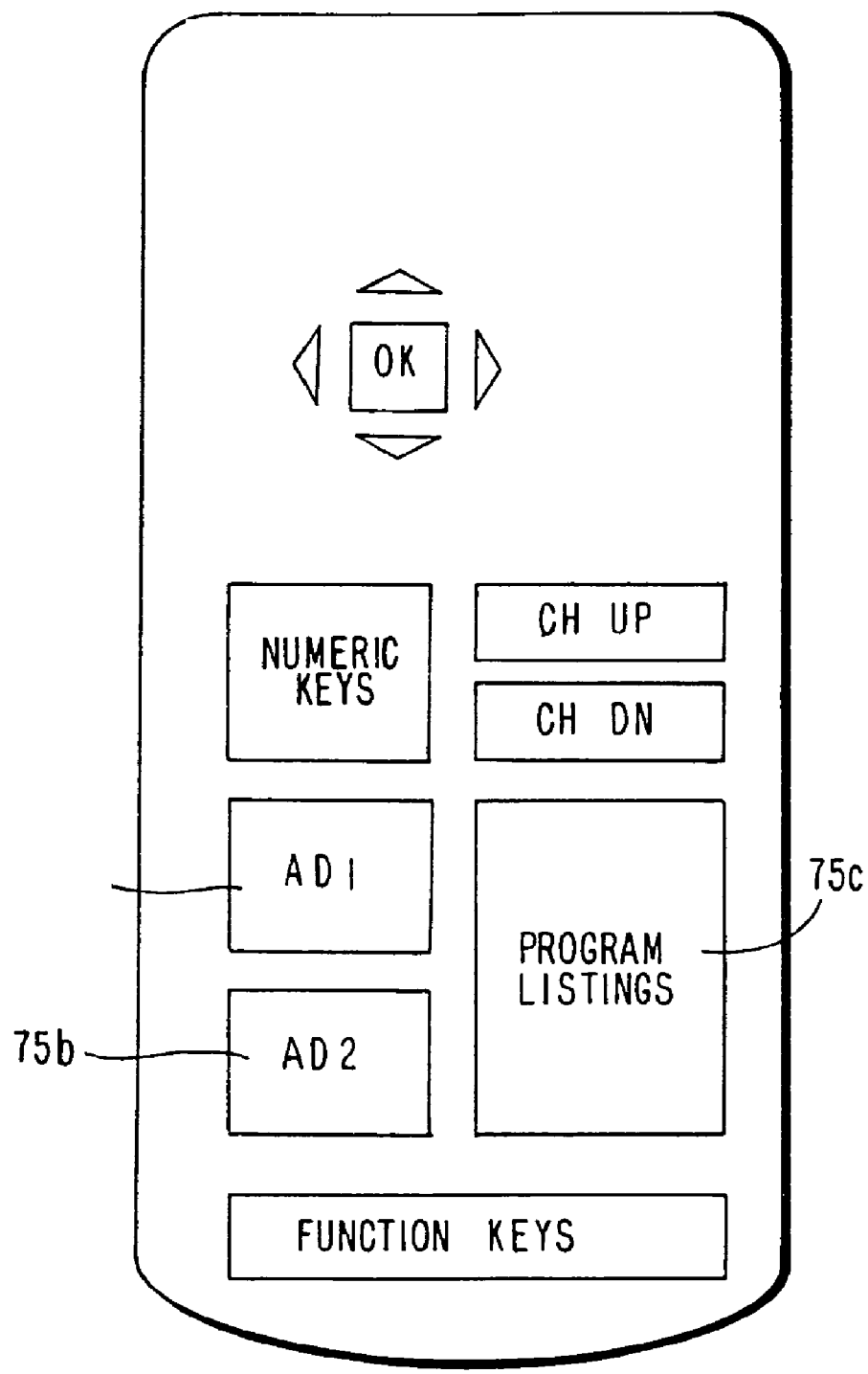
FIG. 4b is a simplified plan view of another illustrative remote control in accordance with the present invention.

If desired, a remote control may be provided that has dedicated buttons 75 with the same shape and layout as the advertisements and program listings on the display screen, as shown in FIG. 4b. Pressing button 75a takes the user to the upper panel advertisement. Pressing button 75b takes the user to the lower panel advertisement. Pressing button 75c takes the user to the program listings region.

As shown in FIG. 3, program guide screens such as screen 60 may be provided with a cable system operator ("MSO") logo 88 and a logo 90 for the provider of the program guide. Any other suitable logos may be provided if desired. A title 92 may be provided to indicate the type of program guide screen that is currently being displayed. The current time and the channel to which set-top box 48 is tuned may be displayed in current time and channel region 93.

Program listings 95 in program listings region 70 may be arranged in a channel ordered list (in the vertical dimension) and by time (in the horizontal orientation). Program listings region 70 typically contains program title information for various television programs and may include descriptive information such as plot summaries, actors, ratings, etc.

Advertisements such as advertisements 62 and 64 may include text, graphics, and video information. A user may select an advertisement of interest by highlighting that advertisement using navigation keys 86 and pressing "OK" key 82 of remote control 74 (FIG. 4). The program guide may take various actions when an advertisement is selected by the user. For example, the program guide may provide a screen such as screen 94 of FIG. 5 that contains text advertising information 96, graphics advertising information 98 (which may include animation), and video advertising information 100. Screen 94 may also contain advertising options 102 that provide the user with further opportunities to view information, place an order, etc.

The action taken by the program guide when a user selects an advertisement varies depending on the type of advertisement. For example, if the advertisement is a promotion for a television program, the program guide may provide the user with an opportunity to tune to the program (if it is currently being broadcast) or to set a reminder for the program (if it is to be broadcast in the future). If the program being promoted in the advertisement is a pay-per-view program, the program guide may provide the user with an opportunity to order the program. If the advertisement is a promotion for a television channel, the program guide may display program listings for that channel.

When an advertisement is a promotion for a television program or channel, text advertising information 96 may be text describing the program or channel, graphics information may be a still image of the actors in the program or a graphic image of a logo. Video advertising information 100 may be a promotional video of the program or upcoming programming on the channel. Screen 94 may contain some or all of these different types of advertising media.

If the advertisement is not directly related to a television program or channel (i.e., the advertisement is a conventional advertisement), the program guide may provide the user with an opportunity to purchase the product or service being advertised. The program guide may also allow the user to view more information on the product or service being advertised. In this situation, the text advertising information 96 of FIG. 5 may be a description of the product or service, the graphics advertising information 98 may be an image of the product or service, and the video advertising information 102 may be a video promotion of the product or service. Advertising options 102 may allow the user to order more information or a brochure, to view a video of the product, or to request a call from a salesperson, etc.

Figure 6:
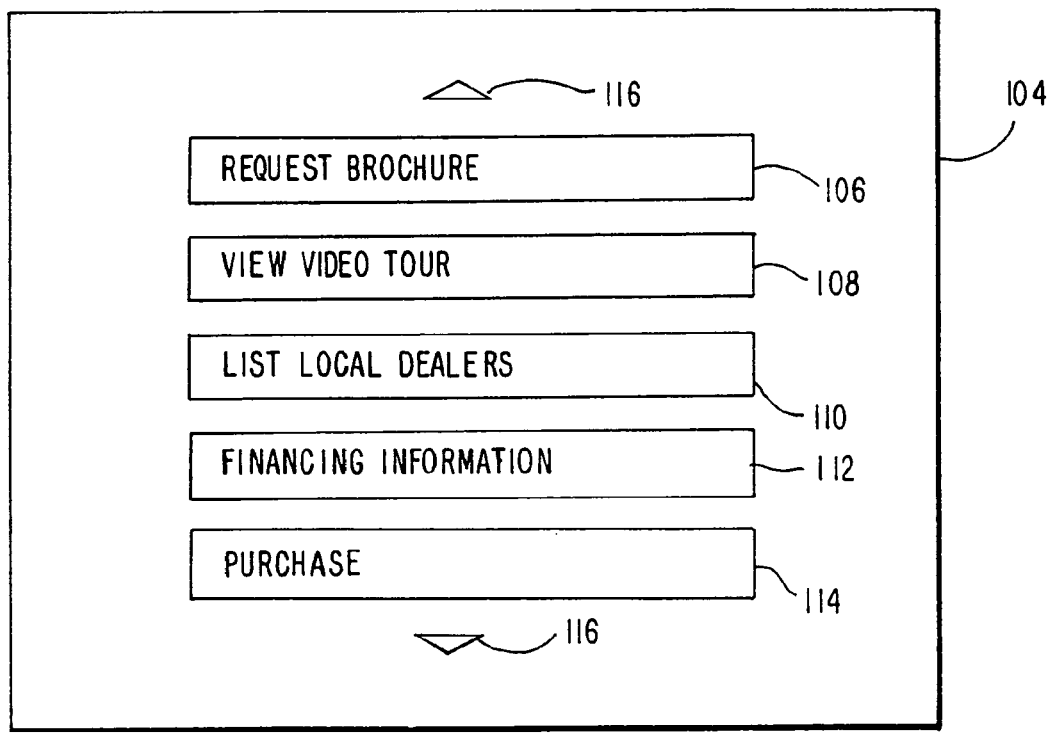
FIG. 6 is a diagram of illustrative advertising options in accordance with the present invention.

For example, if the item being advertised in an advertisement is a new truck, the program guide may provide advertising options 104 of FIG. 6. Advertising options 104 may be presented as part of screen 94, in place of screen 94, or as part of the advertisement itself. Typical options related to advertising a new truck include an option 106 to request a brochure, an option 108 to view a video tour of the new truck, an option 110 to view a list of local dealers, an option 112 to view or request financing information, or an option 114 to purchase the truck. Additional options may be accessed by scrolling up or down, as indicated by arrows 116.

As shown in FIG. 7, an embedded selectable advertisement 118 may be provided within program listings region 120 of program guide screen 122. The user may access region 120 by pressing the "C" navigation key 86c on remote control 74 (FIG. 4a). Selecting program listings region 120 causes the program guide to display highlight 122 at a suitable location within the program listings region. For example, highlight 122 may be placed on the program listing that was most recently highlighted or may be placed on the program listing at the top of program listings region 120.

Advertisement 118 may be fixed or may scroll with the program listings. If advertisement 118 scrolls with the program listings in region 120, pressing the down cursor key 80 when the highlight is on the program listing for channel 9 as shown in FIG. 7 will cause the listings to scroll to the positions shown in FIG. 8. As shown in FIG. 8, highlight region 122 has moved to the program listing for the next program in region 120 (i.e., the listing for channel 10). Moreover, advertisement 118 has moved up one line relative to its position in FIG. 7. Using the up cursor key 80 when highlight 122 is in the top position of program listings region 120 causes the program listings in region 120 and advertisement 118 to scroll in the downward direction.

If advertisement 118 has a fixed position in program listings region 120, scrolling up or down with cursor keys 80 does not affect the position of advertisement 118, but merely moves the program listings. If the down cursor key is pressed when highlight is positioned on top of the channel 9 program listing as shown in FIG. 7, the position of advertisement 118 remains unchanged, but the program listings move up one line and highlight 112 is placed on top of the program listing for channel 10, as shown in FIG. 9.

Figure 10:
FIG. 10 is a diagram of an embedded advertisement arrangement in which the user may page through the program listings without disturbing the position of the advertisement in accordance with the present invention.

If desired, the program guide may allow the user to page through various program listings while the position of an advertisement in the program listings remains fixed, as shown in FIG. 10. To page through the program listings, the user may use remote control page up and down keys (shown as functions keys 84 in FIG. 4a). Alternatively, the program guide may provide a new page of program listings whenever the user activates the down cursor key after positioning the highlight on the last program listing on the page (e.g., the listing for channel 6 on the upper screen of FIG. 10).

Figure 11A:
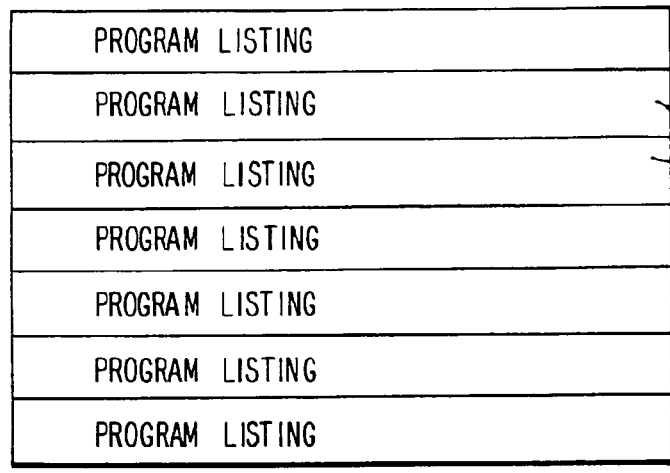
FIGS. 11a, 11b, and 11c are diagrams illustrating how an embedded advertisement may be introduced into a program listings region in real time using a graphics special effect in accordance with the present invention.
Figure 11B:
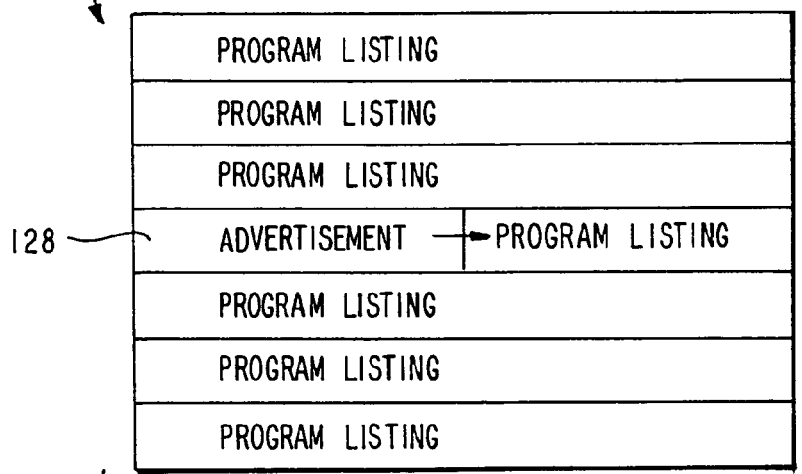
Figure 11C:
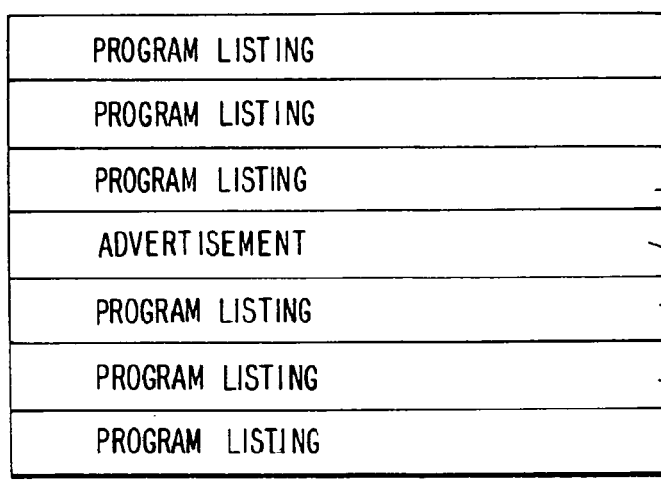

As shown in FIGS. 11a, 11b, and 11c, an advertisement may be inserted into a program listings region dynamically, using graphics animation. In FIG. 11a, program listings region 124 contains only program listings 126. After a suitable time interval (e.g., a few seconds after the program guide presents screen 124 of FIG. 11a), the program guide may generate an animated graphic advertisement that appears to slide into the program listings region 124 dynamically, as shown in FIG. 11b. When the animated sliding movement is complete, the program listings region 124 appears as shown in FIG. 11c, with advertisement 128 embedded in program listings 126. The animated movement shown in FIGS. 11a, 11b, and 11c is illustrative only. Any other suitable type of special effect may be used to display advertisement 128. Examples of special effects that may be used include fades, wipes, bounces, and morphs.

Figures 12A, 12B:
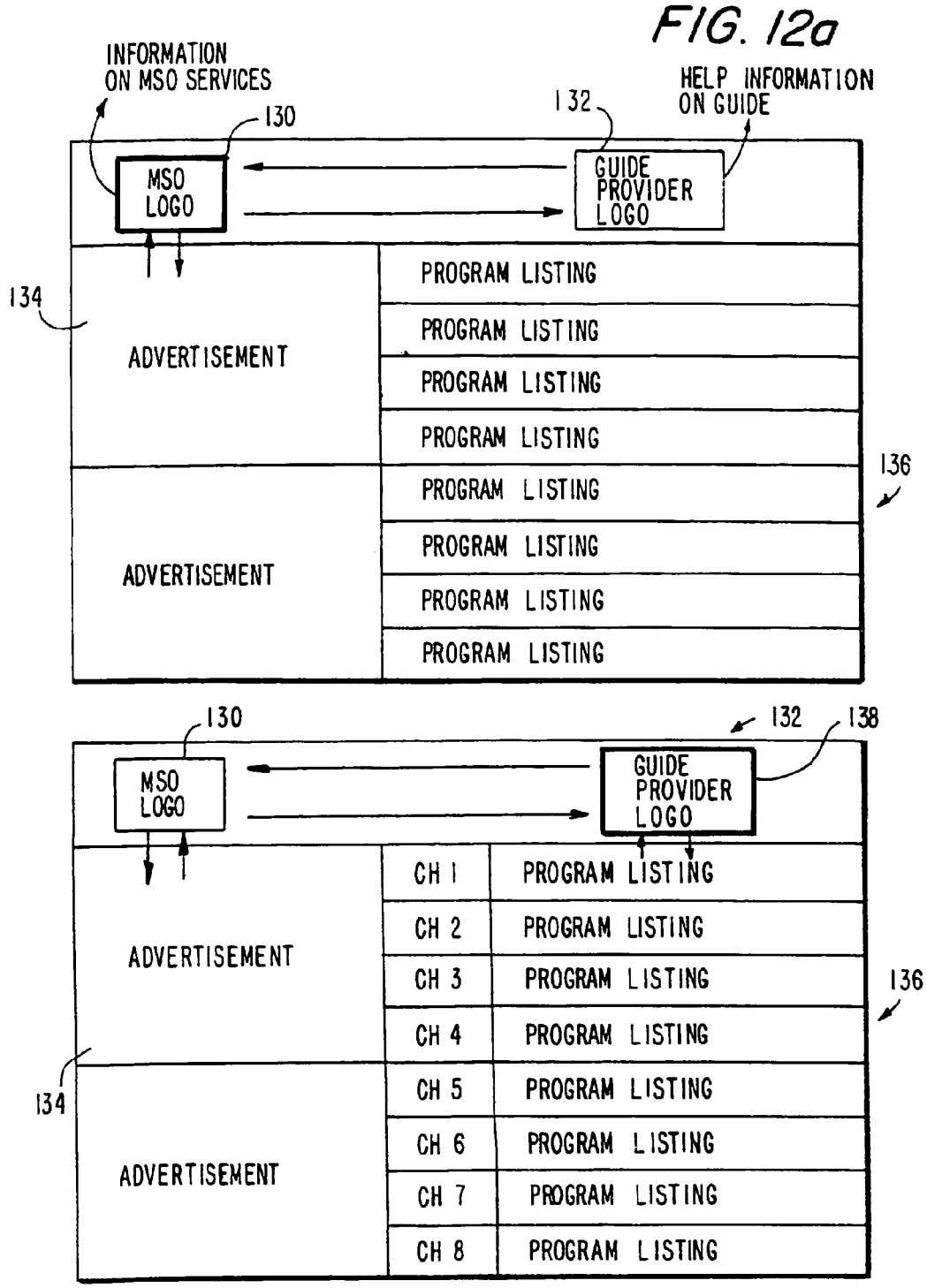
FIGS. 12a and 12b are diagrams illustrating how a user may navigate a highlight to selectable logos in accordance with the present invention.

As shown in FIGS. 12a and 12b, the program guide may allow the user to position highlight region 138 on logos such as MSO logo 130 and program guide provider logo 132 that are not in the program listings region 136. In the arrangement shown in FIG. 12a, the user may navigate to logo 130 from advertisement 134 using an up cursor key 80. The user may navigate from logo 130 to advertisement 134 using a down cursor key 80. Navigation between logo 130 and logo 132 may be accomplished using left and right cursor keys. In the arrangement of FIG. 12b, navigation to guide provider logo 132 is also possible using the up cursor key from program listings region 136. Initially, pressing the up cursor key 80 scrolls the program listings in program listings region 136. After the user has scrolled to the first program listing in the list (e.g., channel 1), further use of the up cursor key 80 causes highlight region 138 to be repositioned from the channel 1 program listing to logo 132, as shown in FIG. 12b.

If the user selects MSO logo 130, the program guide may provide additional information on MSO services. If the user selects guide provider logo 132, the user may be provided with program guide help. These are only examples of the types of information that may be accessed by selecting logos. Any other suitable type of information or program guide function may be accessed in this way if desired.

As shown in FIG. 13, program listings region 140 may contain more than one embedded advertisement. Embedded advertisements such as advertisements 142 and 144 may be used as navigational bridges between the program listings region 140 and advertisements such as panel advertisements 146 and 148. For example, if the user positions highlight 150 on advertisement 142 as shown in FIG. 13, depressing the left cursor key 80 directs the program guide to reposition highlight 150 on advertisement 146. The user may navigate back to advertisement 142 in program listings region 140 using right cursor key 80. If the user positions highlight 150 on advertisement 144, depressing the left cursor key 80 directs the program guide to reposition highlight 150 on advertisement 148. The user may navigate between advertisements 146 and 148 using up and down cursor keys 80.

When the user has positioned highlight 150 on one of program listings 152 in program listings region 140, subsequent use of the left and right cursor keys 80 directs the program guide to display program listings for different times. In the example of FIG. 13, pressing the right cursor key 80 directs the program guide to display program listings for 5:30 PM and 6:00 PM in place of the program listings already displayed for 5:00 PM and 5:30 PM. Pressing the left cursor key 80 directs the program guide to display program listings for 4:30 PM and 5:00 PM in place of the program listings already displayed for 5:00 PM and 5:30 PM.

With the arrangement of FIG. 13, the user may navigate from program listings region 140 to advertisements 146 and 148 using advertisements 142 and 144 as navigational bridges even when the current time (2:03 in the example of FIG. 13) is earlier than the starting time period for the displayed program listings (5:00).

Figure 14:
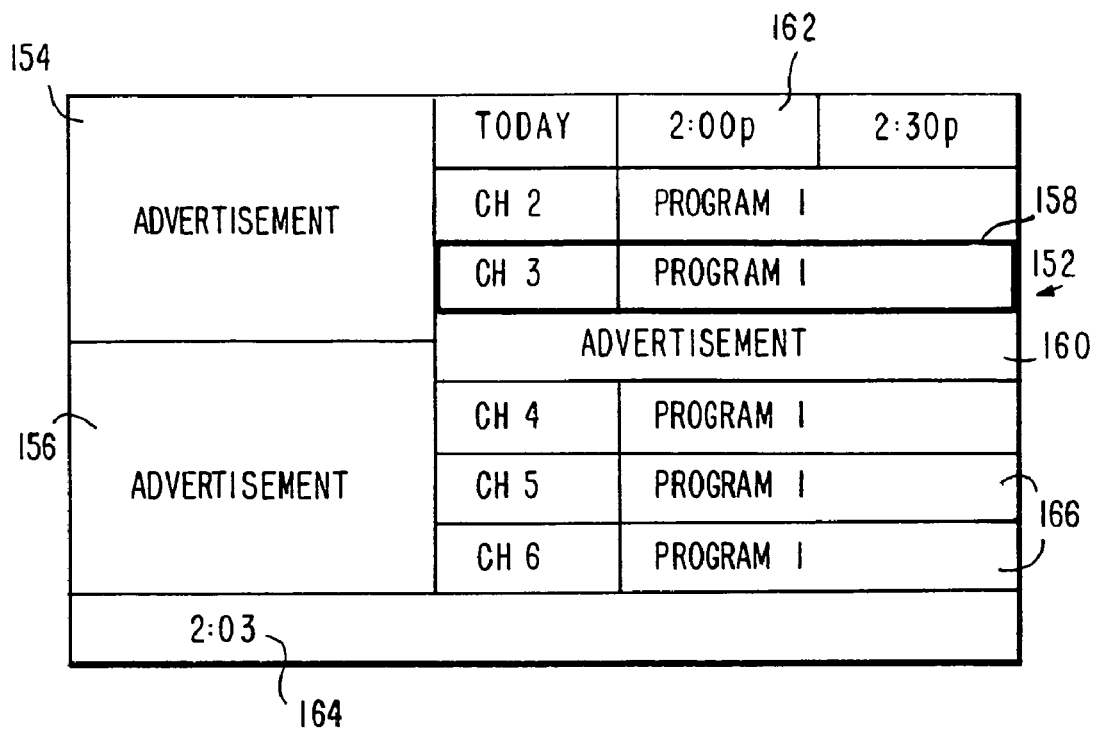
FIG. 14 is a diagram of an illustrative program guide screen containing panel advertisements and a program listings region from which the user may directly navigate to the panel advertisements in accordance with the present invention.

In the arrangement of FIG. 14, the user navigates between the program listings region and advertisements 154 and 156 by repeatedly pressing the left cursor key 80 until the starting time period for the program listings has been reduced to match the current time (within, e.g., a 30 minute window). This is shown in FIG. 14, in which the starting time 162 of the program listings has been reduced to 2:00 PM to bring it in line with the current time 164 (2:03 PM) by repeated pressing of the left cursor key 80 while the highlight 158 was on one of the program listings 166 or on advertisement 160.

When the left cursor key 80 is pressed, the program guide may position highlight 158 on the nearest adjacent advertisement (i.e., advertisement 154 when highlight 158 is on a program listing on the upper portion of the screen or advertisement 156 when highlight 158 is on a program listing on the lower portion of the screen). If desired, the program guide may position highlight 158 on one of the advertisements based on some other criteria, (e.g., always on the upper advertisement, always on the advertisement for which a greater fee has been paid, etc.)

Figure 15:
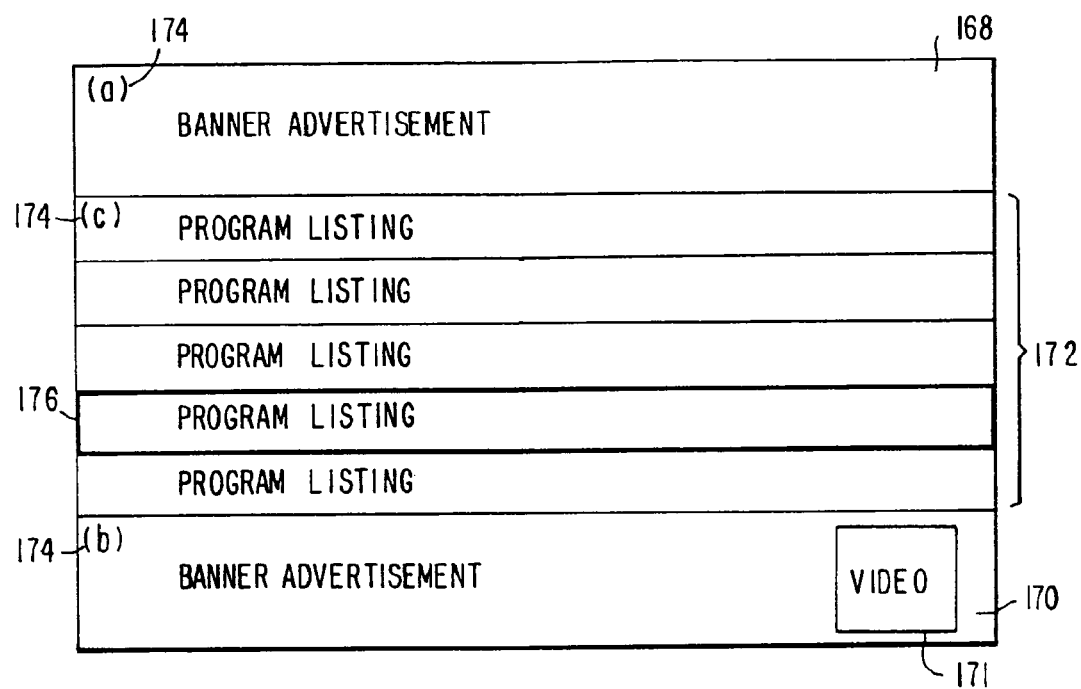
FIG. 15 is a diagram of an illustrative program guide screen containing banner advertisements and a program listings region between which the user may navigate using special navigation keys in accordance with the present invention.

FIG. 15 shows how the program guide may provide advertisements in the form of banner advertisements 168 and 170 positioned above and below the program listings region 172. Advertisement 170 is shown as containing video 171. FIG. 15 shows how advertisements 168 and 170 and program listings region 172 may have labels 174 to assist in navigation between portions of the screen when using special navigational keys such as navigation keys 86 on remote control 74 of FIG. 4a. When the user presses navigation key 86a of remote control 74, the program guide positions highlight 176 on banner advertisement 168. When the user presses navigation key 86b of remote control 74, the program guide positions highlight 176 on banner advertisement 170. When the user presses navigation key 86c of remote control 74, the program guide positions highlight 174 on one of the program listings in program listings region 172 (e.g., the uppermost program listing or the most recently highlighted program listing). If desired, numeric keys may be used as the special navigation keys, rather than dedicated keys 86a, 86b and 86c.

Figure 16:
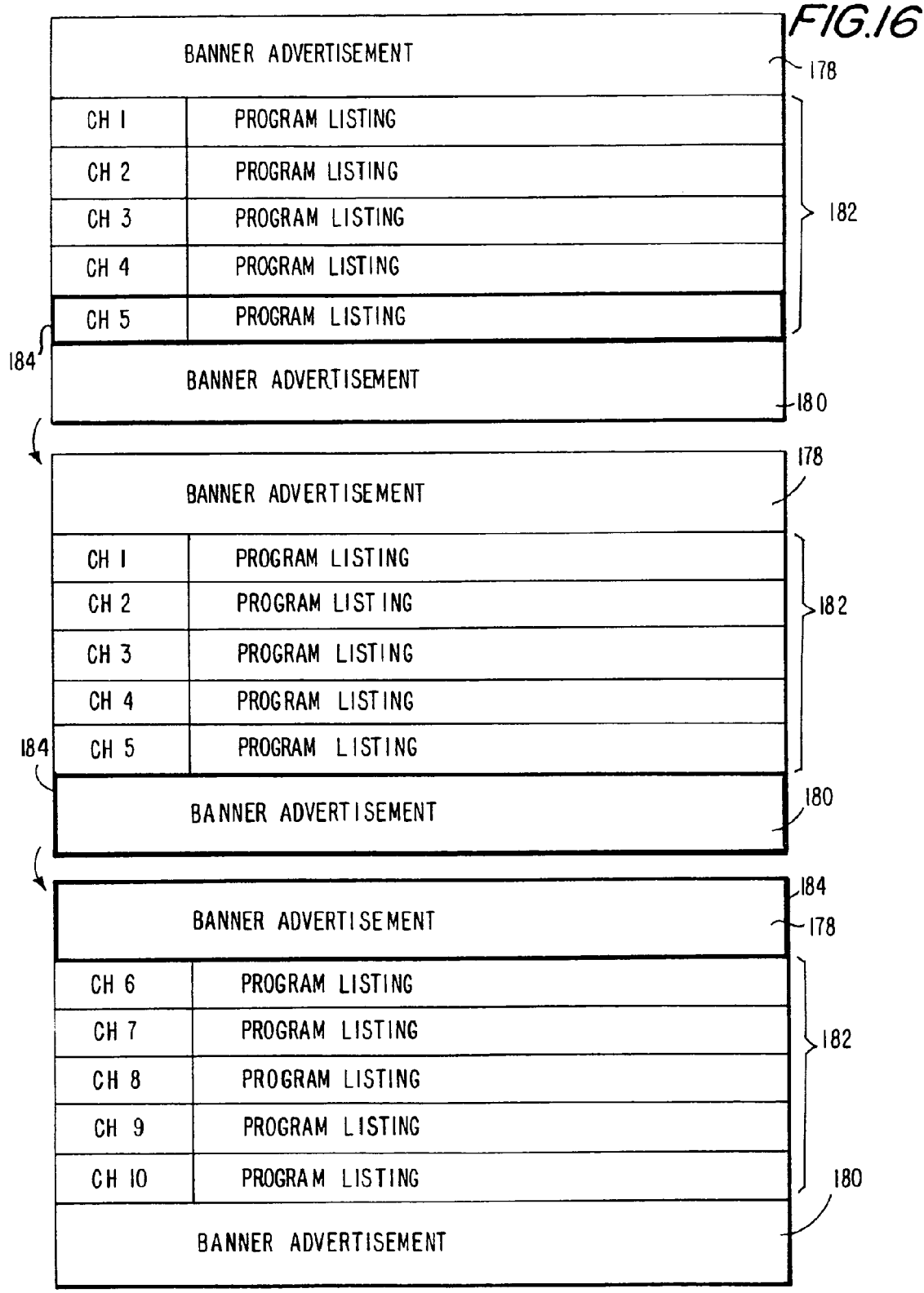
FIG. 16 is a diagram of an illustrative program guide screen containing banner advertisements that shows how a user may scroll program listings by depressing a cursor key after having navigated a highlight to one of the banners in accordance with the present invention.

FIG. 16 shows how the program guide may allow the user to navigate to banner advertisements such as banner advertisements 178 and 180 from program listings region 182 without the use of navigation keys such as dedicated navigation keys 86a, 86b, and 86c of remote control 74 (FIG. 4a). With the arrangement illustrated in FIG. 16, when the user has positioned highlight 184 on the lowermost program listing in program listings region 182 (i.e., the channel 5 program listing as shown in the upper screen of FIG. 16), subsequent activation of down cursor key 80 directs the program guide to reposition highlight region 184 on lower banner advertisement 180, as illustrated in the middle screen of FIG. 16, rather than immediately scrolling the program listings in program listings region 182. Further activation of down cursor key 80 directs the program guide to display the next page of program listings in program listings region 182, as shown in the lower screen in FIG. 16, while repositioning highlight 184 on banner advertisement 178. The user may then activate down cursor 80 to position highlight 184 on a desired listing.

The user may navigate to upper banner advertisement 178 using the up cursor key 80. When the user has positioned highlight 184 on the uppermost program listing in program listings region 182, subsequent activation of up cursor key 80 directs the program guide to reposition highlight region 184 on upper banner advertisement 178. Activation of up cursor key 80 when highlight region 184 is positioned on advertisement 178 directs the program guide to display the previous page of program listings in program listings region 182, while repositioning highlight region 184 on banner advertisement 180. The user may then activate up cursor 80 to position highlight 184 on a desired listing.

Advertisements may be used to promote any desired type of product or service. When advertisements are used to promote television programs, the program guide may allow the selection of an advertisement to provide access to program guide features that might otherwise be accessed by selecting a program listing from a program guide screen. Features that may be accessed in this way include viewing (tuning to) a program, recording a program, setting a reminder for a program, etc. This allows advertisements to be used to promote programs, thereby generating revenue and increasing the user's awareness of the availability of the advertised programs, while continuing to provide the user with the same program guide features with which the user is most familiar.

Figure 17:
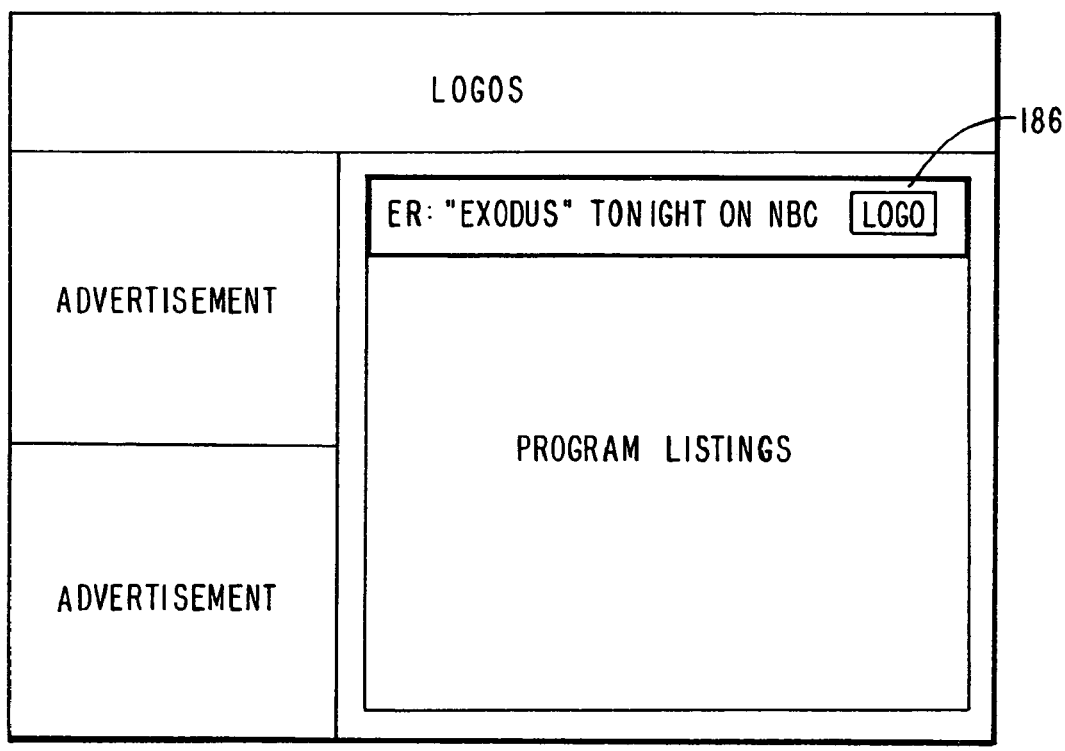
FIG. 17 is a diagram of an illustrative program guide screen containing panel advertisements and a selectable program-related banner advertisement in accordance with the present invention.
Figure 18:
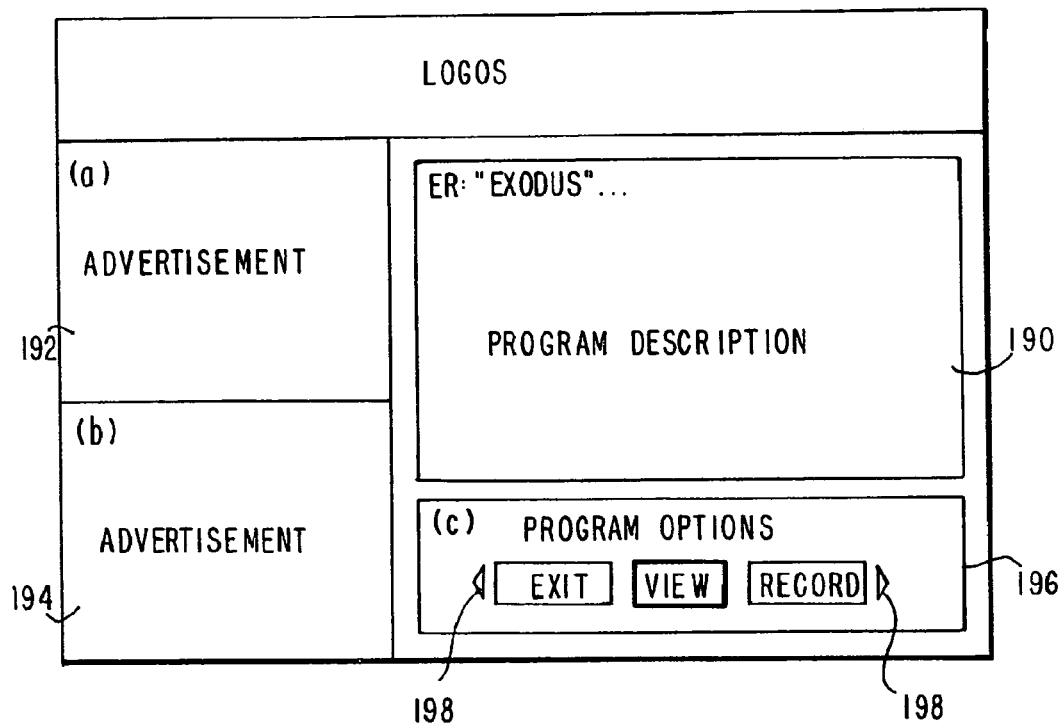
FIG. 18 is a diagram of an illustrative program guide screen that may be provided when the user selects a program-related advertisement such as the program-related banner advertisement of FIG. 17 in accordance with the present invention.

For example, if the user selects advertisement 186 of FIG. 17 for the program "ER," the program guide may present screen 188 of FIG. 18, which contains a program description 190 for an episode of ER, advertisements 192 and 194, and program options 196. Program options 196 include "exit" (to exit screen 188), "view" (to tune to the channel for ER), and "record" (to instruct the program guide implemented in set-top box 48 to direct videocassette recorder 50 to record ER). Other options may be accessed by using left and right cursor keys 80, as indicated by arrows 198.

Figure 19:
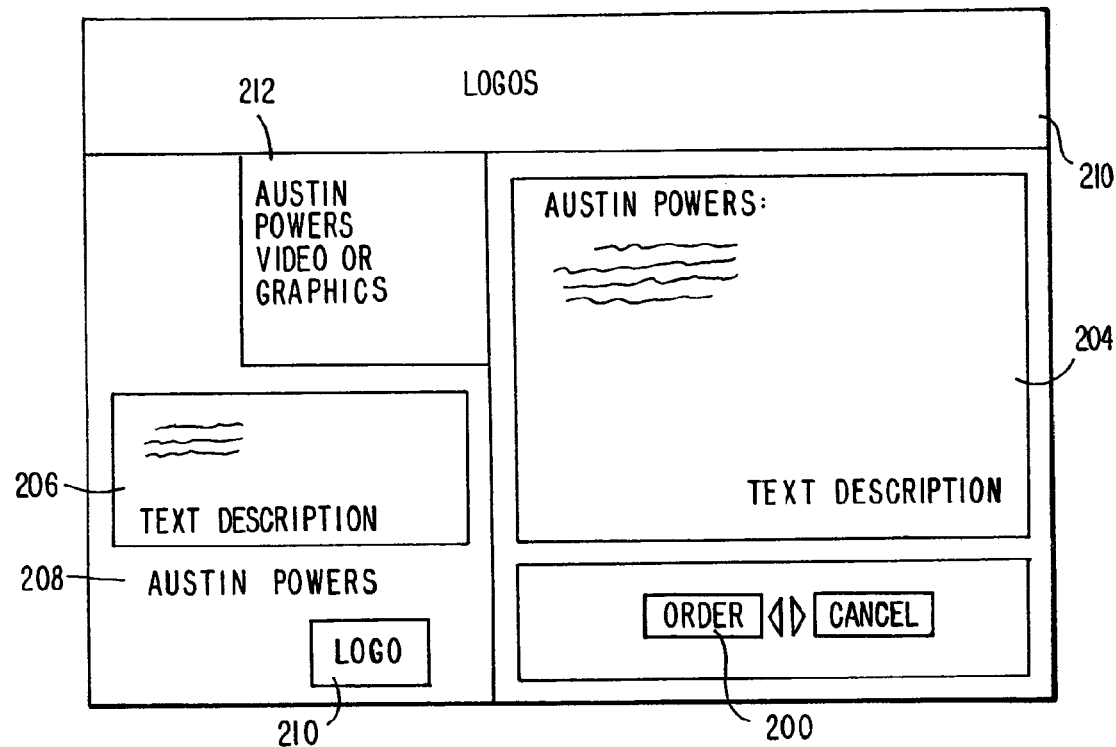
FIG. 19 is a diagram of an illustrative program guide screen that may be provided when the user selects a pay-per-view program-related advertisement in accordance with the present invention.

The program options that may be provided depend on the type of program being advertised in the selected advertisement. For example, if a selected advertisement is for a future program, the program guide might provide the user with an opportunity to set a reminder for the program. As shown in FIG. 19, if an advertisement for a pay-per-view program is selected, the user may be presented with an option 200 to order the program. Screen 202 also contains program descriptions 204 and 206, title 208, logos 210, and an area 212 containing a video of the program (which may be provided, e.g., over a digital channel on path 46), a still image, or other such material.

The descriptions provided in descriptions regions such as those for descriptions 204 and 206 may be promotional descriptions that are specifically designed to attract viewer interest or may be more neutral reviews of the program being described.

Figure 20:
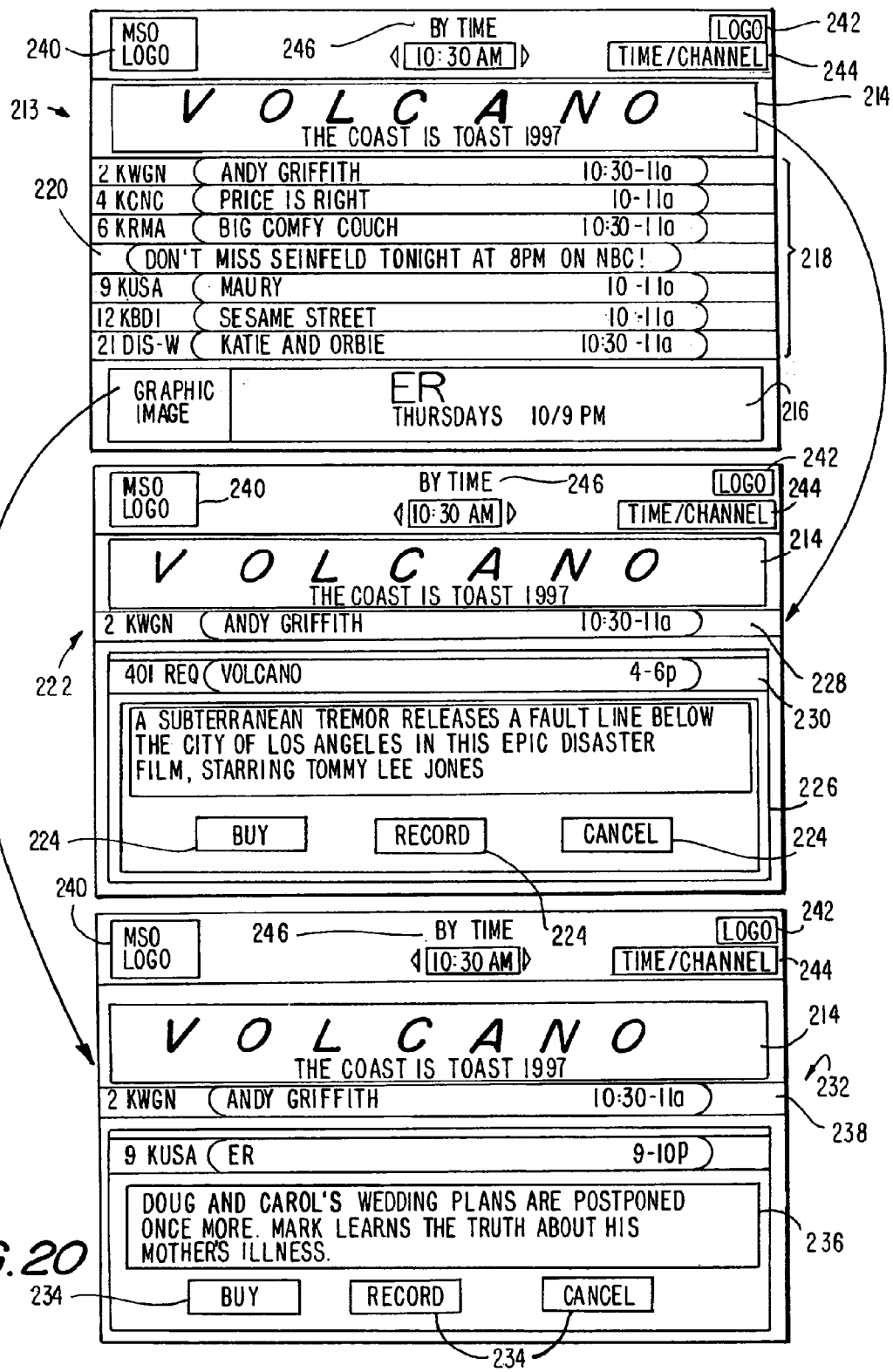
FIG. 20 is a diagram of an illustrative program guide screen with banner advertisements (upper screen), an illustrative screen that may be provided when a pay-per-view program-related advertisement is selected (middle screen), and an illustrative screen that may be provided when a non-pay-per-view program related advertisement is selected (lower screen) in accordance with the present invention.

Screen 213 of FIG. 20 contains banner advertisement 214 for a pay-per-view program and banner advertisement 216 for a series. Program listings region 218 contains an embedded advertisement 220. Navigation between the advertisements and program listings of screen 213 may be accomplished using up and down cursor keys as shown in FIG. 16.

If the user selects advertisement 214 of FIG. 20, the user is presented with screen 222. Because the program "Volcano" that is the subject of advertisement 214 is a pay-per-view program, selecting advertisement 214 directs the program guide to display pay-per-view program options 224 as part of pay-per-view description box 226. Program options 224 include options to buy the program Volcano (e.g., by impulse ordering or by calling a certain telephone number), to record the program, or to cancel the presentation of box 226 and options 224. Box 226 may also include information 230 on the channel and airtimes of the program of interest. With the arrangement of screen 222, the uppermost program listing from program listings region 218 of screen 213 (i.e., the program listing 228 for the program "Andy Griffith") is still displayed. This provides the user with a visual cue that the program listings of program listings region 218 are still available if the user selects "cancel."

If the user selects advertisement 216 of FIG. 20, the user is presented with screen 232. Because the program "ER" that is the subject of advertisement 216 is not currently being broadcast and is not a pay-per-view program, selecting advertisement 216 directs the program guide to display program options 234 as part of description box 236. Program options 234 include options to set a reminder for the program (so that the program guide will generate a reminder message when the program is about to be aired), to record the program, or to cancel. With the arrangement of screen 232, the uppermost program listing from program listings region 218 of screen 213 (i.e., the program listing 238 for the program "Andy Griffith") is still displayed. This provides the user with a visual cue that the program listings of program listings region 218 are still available if the user selects "cancel."

When the program guide displays screens 222 and 232, the program descriptions information and program options are displayed on the lower portion of the screen, so that upper banner advertisement 214 is not blocked. Logos 240 and 242 may be displayed on screens 213, 222, and 232. The current time and channel to which set-top box 48 is tuned may be displayed simultaneously or periodically (e.g., alternating every few seconds) in region 244. The title of the program guide display screen may be displayed in region 246.

As shown in FIG. 21, the program guide may automatically position embedded advertisements such as embedded advertisement 248 immediately adjacent to the program listings for the channel (e.g., channel 1) that the embedded advertisement is promoting. For example, advertisement 248 may contain text and graphics that promote program "X" on channel 1. Advertisement 248 is immediately adjacent to program listing 252 for channel 1. The content of the embedded advertisement need not be directly related to the promotion of the adjacent program, but may be related to the adjacent program in some other way. For example, an embedded advertisement for football souvenirs may be placed immediately adjacent to the program listing for a football game. If desired, the program guide may provide the user with an opportunity to purchase an advertised product by selecting such an advertisement. Because advertisements such as advertisement 248 may contain colorful text, graphics (including animation), and video that attract the user's attention to the subject of the advertisement, placing such advertisements adjacent to their associated program listings may increase the user's interest in the program listings. Embedded advertisements may be repositioned with the program listings (e.g., during scrolling or paging of the program listings by the user), so that they remain immediately adjacent to their associated program listings.

If the embedded advertisement is for a program, users who are attracted to the advertisement does not have to scroll through the listings (potentially for many pages) to locate the program listings for the program being promoted. This provides the user with a simple visual indication of the association between, e.g., the channel 1 program listing and the adjacent embedded advertisement. It also provides the user with access to both the original program listing for the program and the advertisement. Because the content of the description and the options that are available may differ between the program listing and the advertisement, access to both the program listings and the advertisement provides the user with more options.

Moreover, users who are interested in certain program listings often revisit those program listings. The advertising space adjacent to such program listings may therefore be desirable for certain advertisers. Routinely positioning embedded advertisements immediately adjacent to associated program listings, may increase the value of such embedded advertisements to advertisers.

Figure 22:
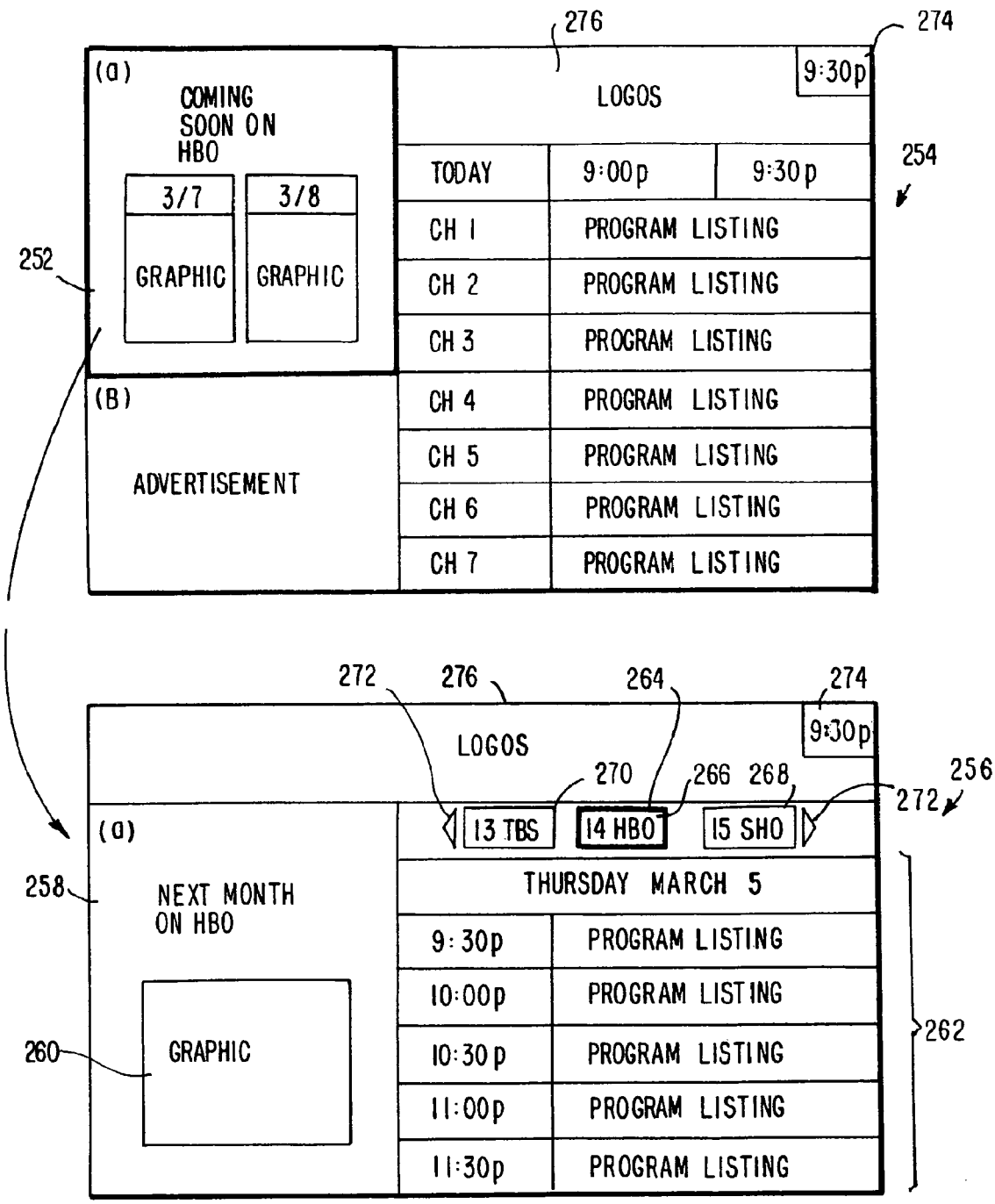
FIG. 22 is a diagram illustrating how a program guide in accordance with the present invention may provide a program guide screen containing advertisements related to a particular channel (upper screen) and how selection of such an advertisement may direct the program guide to present a program guide screen containing a time-ordered list of program listings for that channel (lower screen) in accordance with the present invention.

As shown in FIG. 22, advertisements may be related to a particular channel (e.g., the channel "HBO"). If the user selects HBO advertisement 252 of screen 254, the program guide may present a screen such as screen 256. Screen 256 contains an advertisement 258 that is related to HBO. Advertisement 258 is shown as containing a graphic image 260, but may contain any suitable combination of text, graphics (including animation), and video. Program listings region 262 contains a time-ordered list of programs scheduled to appear on HBO. Highlight 264 in screen 256 is positioned on top of a menu option 266 for the channel "HBO." The user can navigate to menu option 268 (for the channel "SHO") and menu option 270 (for the channel "TBS") using left and right cursor keys 80. Additional channels can be accessed by further use of the left and right cursor keys 80, as indicated by arrows 272. The current time 274 and logos 276 may be displayed on both screens 254 and 256.

FIG. 23 is a flow chart of illustrative actions that may be taken by the program guide when the user selects an advertisement. At step 278, the program guide displays a selectable advertisement as part of a suitable program guide screen. At step 280, the user may use a remote control such as remote control 74 of FIG. 4a to select a desired advertisement. Selecting an advertisement involves navigating to the advertisement by positioning a highlight on the advertisement with cursor keys 80 and activating a select or "OK" key 82. Any suitable type of highlight may be used to highlight the advertisement, including highlights based on changes in color, shading, outlines, etc.

The type of action that the program guide takes next depends on the type of advertisement selected by the user. Actions that may be taken include: tuning to a channel (step 282), setting a reminder for a program (step 284), recording a program (step 286), arranging for the purchase of a pay-per-view program (step 288), arranging for the purchase of a video-on-demand (VOD) program (step 290), displaying program listings (step 292), displaying additional information (step 294), processing an inquiry for additional information such as a brochure request, etc. (step 296), and arranging for the purchase of goods or services (step 298). The program guide may perform these steps separately or in any suitable combination.

The foregoing is merely illustrative of the principles of this invention and various modifications can be made by those skilled in the art without departing from the scope and spirit of the invention.

What is claimed is:

1. A system in which an interactive television program guide is implemented on user television equipment comprising:
   means for presenting a program guide screen containing a program listings region with the interactive television program guide, wherein the program listings region includes a first and second area;
   means for presenting a panel advertisement adjacent to the program listings region;
   means for displaying an embedded advertisement in the program listings region and at least one program listing in the program listings region, wherein the at least one program listing corresponds to the first area in the program listings region;
   means for displaying a highlight;
   means for receiving a user input;
   in response to receiving the user input, means for determining whether the embedded advertisement or the at least one program listing is highlighted;
   in response to determining that the embedded advertisement is highlighted, means for navigating the highlight from the embedded advertisement in the program listings region to the panel advertisement; and
   in response to determining that the at least one program listing is highlighted, means for navigating the highlight from the at least one program listing to the second area in the program listings region.

2. The system defined in claim 1 further comprising:
   means for navigating the highlight from the program listings region to the panel advertisement using a remote control navigation key other than a cursor key.

3. The system defined in claim 1 further comprising:
   means for navigating the highlight from the program listings region to the panel advertisement using a cursor key.

4. A method for using an interactive television program guide implemented on user television equipment, comprising the steps of:

presenting a program guide screen containing a program listings region with the interactive television program guide, wherein the program listings region includes a first and second area;

presenting a panel advertisement adjacent to the program listings region;

displaying an embedded advertisement in the program listings region and at least one program listing in the program listings region, wherein the at least one program listing corresponds to the first area in the program listings region;

displaying a highlight;

receiving a user input;

in response to receiving the user input, determining whether the embedded advertisement or the at least one program listing is highlighted;

in response to determining that the embedded advertisement is highlighted, navigating the highlight from the embedded advertisement in the program listings region to the panel advertisement; and in response to determining that the at least one program listing is highlighted, navigating the highlight from the at least one program listing to the second area in the program listings region.

5. The method defined in claim 4 further comprising the step of navigating the highlight from the program listings region to the panel advertisement using a remote control navigation key other than a cursor key.

6. The method defined in claim 4 further comprising the step of navigating the highlight from the program listings region to the panel advertisement using a cursor key.

7. The method defined in claim 4 further comprising the step of implementing the interactive television program guide on a set-top box.

8. The method defined in claim 4 wherein the first area of the program listings region is displayed above the embedded advertisement and the second area of the program listings region is displayed below the embedded advertisement, wherein the user must navigate through the embedded advertisement in order to navigate from the first area to the second area of the program listings region.

9. The method defined in claim 4 further comprising the step of presenting an advertisement containing advertisement options on the program guide screen.

10. The method defined in claim 4 wherein the step of presenting the panel advertisement further comprises the step of presenting a selectable panel advertisement, the method further comprising the step of providing the user with an opportunity to set a reminder when the user selects the panel advertisement.

11. The method defined in claim 4 wherein the step of presenting the panel advertisement further comprises the step of presenting a selectable panel advertisement, the method further comprising the step of providing the user with an opportunity to tune to a given channel when the user selects the panel advertisement.

12. The method defined in claim 4 wherein the step of presenting the panel advertisement further comprises the step of presenting a selectable panel advertisement, the method further comprising the step of providing the user with an opportunity to record a program when the user selects the panel advertisement.

13. The method defined in claim 4 wherein the step of presenting the panel advertisement further comprises the step of presenting a selectable panel advertisement, the method further comprising the step of providing the user with an opportunity to purchase a program when the user selects the panel advertisement.

14. The method defined in claim 4 wherein the step of presenting the panel advertisement further comprises the step of presenting a selectable panel advertisement, the method further comprising the step of providing the user with an opportunity to display program listings when the user selects the panel advertisement.

15. The method defined in claim 4 wherein the step of presenting the panel advertisement further comprises the step of presenting a selectable panel advertisement, the method further comprising the step of providing the user with an opportunity to display additional information when the user selects the panel advertisement.

16. The method defined in claim 4 wherein the step of presenting the panel advertisement further comprises the step of presenting a selectable panel advertisement, the method further comprising the step of providing the user with an opportunity to process an inquiry for additional information when the user selects the panel advertisement.

17. The method defined in claim 4 wherein the step of presenting the panel advertisement further comprises the step of presenting a selectable panel advertisement, the method further comprising the step of providing the user with an opportunity to purchase goods when the user selects the panel advertisement.

18. The method defined in claim 4 further comprising the step of scrolling the embedded advertisement together with the program listings in first area in the the program listings region.

19. The method defined in claim 4 further comprising the step of changing the position of the program listings in the first area of the program listings region without changing the position of the embedded advertisement within the first area of the program listings region.

20. The method defined in claim 4 further comprising the step of introducing the embedded advertisement into the program listings region using animation.

21. The method defined in claim 4 further comprising the steps of:

presenting selectable logos on the program guide screen; and navigating the highlight from the program listings region to the selectable logos.

22. The method defined in claim 4 further comprising the step of cycling the content of the panel advertisement.

23. The method defined in claim 4 further comprising the steps of: cycling the content of the panel advertisement; and providing a fade between the content of the panel advertisement as the content is cycled.

24. The method defined in claim 4 further comprising the step of automatically displaying the embedded advertisement in the program listings region immediately adjacent to an associated one of the program listings in the program listings region.

* * * * *

UNITED STATES PATENT AND TRADEMARK OFFICE
CERTIFICATE OF CORRECTION

| | | |
|---|---|---|
| PATENT NO. | : 8,397,259 B2 | Page 1 of 1 |
| APPLICATION NO. | : 12/891385 | |
| DATED | : March 12, 2013 | |
| INVENTOR(S) | : Edward B. Knudson et al. | |

It is certified that error appears in the above-identified patent and that said Letters Patent is hereby corrected as shown below:

In the Claims

Column 16, claim 18, line 35, change "in first area in the the program" to --in the first area in the program--.

Signed and Sealed this
Twenty-seventh Day of May, 2014

Michelle K. Lee
*Deputy Director of the United States Patent and Trademark Office*